(12) United States Patent
Lee et al.

(10) Patent No.: US 9,661,134 B2
(45) Date of Patent: May 23, 2017

(54) SYSTEMS AND METHODS FOR IP AND VOIP DEVICE LOCATION DETERMINATION

(71) Applicant: iPOSI, INC., Denver, CO (US)

(72) Inventors: Richard M. Lee, Denver, CO (US); Richard Keegan, Palos Verdes Estate, CA (US)

(73) Assignee: iPosi, Inc., Denver, CO (US)

( * ) Notice: Subject to any disclaimer, the term of this patent is extended or adjusted under 35 U.S.C. 154(b) by 363 days.

(21) Appl. No.: 13/748,318

(22) Filed: Jan. 23, 2013

(65) Prior Publication Data

US 2013/0135147 A1 May 30, 2013

Related U.S. Application Data

(63) Continuation of application No. 13/098,215, filed on Apr. 29, 2011, now Pat. No. 8,867,531, which is a
(Continued)

(51) Int. Cl.
*H04M 3/42* (2006.01)
*G01S 5/00* (2006.01)
(Continued)

(52) U.S. Cl.
CPC ....... *H04M 3/42348* (2013.01); *G01S 5/0027* (2013.01); *G01S 19/06* (2013.01);
(Continued)

(58) Field of Classification Search
CPC ........ G01S 19/06; G01S 19/235; G01S 19/25; G01S 19/252; G01S 5/0027;
(Continued)

(56) References Cited

U.S. PATENT DOCUMENTS

| 4,445,118 A | 4/1984 | Taylor et al. |
| 5,365,450 A | 11/1994 | Schuchman et al. |

(Continued)

FOREIGN PATENT DOCUMENTS

| JP | 5-503775 | 6/1993 |
| JP | 2002221563 | 8/2002 |

(Continued)

OTHER PUBLICATIONS

Japanese Office Action, Japanese Application No. 2013-098381, Mailing Date Apr. 22, 2014, 1-12 pages.
(Continued)

*Primary Examiner* — Khaled Kassim
(74) *Attorney, Agent, or Firm* — Marsh Fischmann & Breyfogle LLP

(57) ABSTRACT

A method and system for precise position determination of general Internet Protocol (IP) network-connected devices. A method enables use of remote intelligence located at strategic network points to distribute relevant assistance data to IP devices with embedded receivers. Assistance is tailored to provide physical timing, frequency and real time signal status data using general broadband communication protocols. Relevant assistance data enables several complementary forms of signal processing gain critical to acquire and measure weakened or distorted in-building Global Navigation Satellite Services (GNSS) signals and to ultimately extract corresponding pseudo-range time components. A method to assemble sets of GNSS measurements that are observed over long periods of time while using standard satellite navigation methods, and once compiled, convert using standard methods each pseudo-range into usable path distances used to calculate a precise geographic position to a known degree of accuracy.

16 Claims, 14 Drawing Sheets

Related U.S. Application Data continuation of application No. 11/433,062, filed on May 11, 2006, now Pat. No. 7,961,717.

(60) Provisional application No. 60/680,190, filed on May 12, 2005.

(51) Int. Cl.
| | | |
|---|---|---|
| *G01S 19/06* | (2010.01) | |
| *G01S 19/23* | (2010.01) | |
| *G01S 19/25* | (2010.01) | |
| *H04M 7/00* | (2006.01) | |
| *G01S 19/42* | (2010.01) | |
| *G01S 19/17* | (2010.01) | |

(52) U.S. Cl.
CPC ............ *G01S 19/17* (2013.01); *G01S 19/235* (2013.01); *G01S 19/25* (2013.01); *G01S 19/252* (2013.01); *G01S 19/42* (2013.01); *H04M 7/006* (2013.01); *H04M 3/42102* (2013.01); *H04M 3/42365* (2013.01); *H04M 2242/04* (2013.01); *H04M 2242/30* (2013.01)

(58) Field of Classification Search
CPC ......... H04M 2242/04; H04M 2242/30; H04M 3/42102; H04M 3/42365; H04M 7/006
See application file for complete search history.

(56) References Cited

U.S. PATENT DOCUMENTS

| | | |
|---|---|---|
| 5,663,734 A | 9/1997 | Krasner |
| 5,781,156 A | 7/1998 | Krasner |
| 5,841,396 A | 11/1998 | Krasner |
| 6,064,336 A | 5/2000 | Krasner |
| 6,084,547 A | 7/2000 | Sanderford et al. |
| 6,236,365 B1 | 5/2001 | LeBlanc |
| 6,252,545 B1 | 6/2001 | Da et al. |
| 6,289,041 B1 | 9/2001 | Krasner |
| 6,389,291 B1 | 5/2002 | Pande et al. |
| 6,448,928 B1* | 9/2002 | Knox et al. ............ 342/357.31 |
| 6,473,030 B1 | 10/2002 | McBurney et al. |
| 6,559,800 B2 | 5/2003 | Rabinowitz et al. |
| 6,650,901 B1* | 11/2003 | Schuster et al. ........... 455/456.1 |
| 6,684,250 B2 | 1/2004 | Anderson et al. |
| 6,940,950 B2 | 9/2005 | Dickinson et al. |
| 6,943,729 B2 | 9/2005 | Dobson |
| 6,970,132 B2 | 11/2005 | Spilker, Jr. |
| 7,119,742 B2 | 10/2006 | Cho |
| 7,187,997 B2 | 3/2007 | Johnson |
| 9,319,519 B2 | 4/2016 | Lee |
| 2001/0028321 A1 | 10/2001 | Krasner |
| 2002/0057764 A1 | 5/2002 | Salvucci |
| 2002/0085538 A1 | 7/2002 | Leung |
| 2003/0016166 A1* | 1/2003 | Jandrell ................ G01S 5/0018 342/357.64 |
| 2003/0083837 A1 | 5/2003 | Dinning |
| 2003/0086539 A1 | 5/2003 | McCalmont |
| 2003/0109245 A1 | 6/2003 | McCalmont |
| 2003/0146871 A1* | 8/2003 | Karr et al. ................ 342/457 |
| 2003/0185237 A1* | 10/2003 | Baker, Jr. ................ 370/469 |
| 2004/0008660 A1 | 1/2004 | Lee |
| 2004/0041728 A1* | 3/2004 | Bromley ............... G01S 5/0018 342/357.64 |
| 2004/0057425 A1 | 3/2004 | Brouwer et al. |
| 2004/0160909 A1 | 8/2004 | Sheynblat |
| 2004/0180671 A1 | 9/2004 | Spain, Jr. |
| 2004/0203853 A1* | 10/2004 | Sheynblat ............... G01S 1/026 455/456.1 |
| 2005/0014482 A1 | 1/2005 | Holland et al. |
| 2005/0047574 A1 | 3/2005 | Reid |
| 2005/0048947 A1* | 3/2005 | Holland et al. ............ 455/404.1 |
| 2005/0063519 A1 | 3/2005 | James |
| 2005/0080561 A1 | 4/2005 | Abraham et al. |
| 2005/0111630 A1 | 5/2005 | Potorny |
| 2005/0117556 A1* | 6/2005 | Lee et al. ................ 370/338 |
| 2005/0135569 A1 | 6/2005 | Dickinson |
| 2005/0175166 A1* | 8/2005 | Welenson et al. ........ 379/265.02 |
| 2005/0190892 A1* | 9/2005 | Dawson et al. ................ 379/37 |
| 2005/0212504 A1* | 9/2005 | Revital et al. ................ 324/100 |
| 2005/0213716 A1 | 9/2005 | Zhu |
| 2005/0232189 A1* | 10/2005 | Loushine ................ 370/328 |
| 2006/0009235 A1* | 1/2006 | Sheynblat ............. G01S 5/0036 455/456.1 |
| 2006/0023655 A1* | 2/2006 | Engel et al. ................... 370/328 |
| 2006/0025158 A1 | 2/2006 | Leblanc et al. |
| 2006/0030340 A1* | 2/2006 | Lin et al. ................ 455/457 |
| 2006/0047835 A1* | 3/2006 | Greaux ................ 709/229 |
| 2006/0193447 A1 | 8/2006 | Schwartz |
| 2007/0200757 A1* | 8/2007 | Homiller ............... G01C 21/206 342/357.48 |
| 2008/0037536 A1 | 2/2008 | Padmanabhan |
| 2008/0129591 A1* | 6/2008 | Lamance ................ G01S 19/05 342/357.42 |
| 2012/0243466 A1* | 9/2012 | Hagens et al. ................ 370/328 |

FOREIGN PATENT DOCUMENTS

| | | |
|---|---|---|
| JP | 2002-357652 | 12/2002 |
| JP | 2003-503942 | 1/2003 |
| JP | 2004-507186 | 3/2004 |
| JP | 2004-226406 | 8/2004 |
| JP | 2005-512363 | 4/2005 |
| JP | 2008545122 | 12/2008 |
| WO | 91-09275 | 6/1991 |
| WO | 01/03344 | 1/2001 |
| WO | 02/15612 | 2/2002 |
| WO | 03/045084 | 5/2003 |

OTHER PUBLICATIONS

Yilin Zhao: "Standardization of Mobile Phone Positioning for 3G Systems" IEEE Communications Magazine, IEEE Service Center, Piscataway, U.S., vol. 40, No. 7, Jul. 1, 2002, pp. 108-116.

Lawrence R. Weill, Nobuhiro Kishimoto, Seiichiro Hirata and Kevin Xinhua Chin, "The Next Generation of a Super Sensitive GPS System" ION GNSS 17th International Technical Meeting of the Satellite Division, Sep. 21-24, 2004, Long Beach CA, pp. 1924-1935.

\* cited by examiner

SYSTEMS AND METHODS FOR IP AND VOIP DEVICE LOCATION DETERMINATION

RELATED APPLICATIONS

This application is a continuation of and claims priority from U.S. patent application Ser. No. 13/098,215, filed Apr. 29, 2011, entitled "SYSTEMS AND METHODS FOR IP AND VOIP DEVICE LOCATION DETERMINATION," which is a continuation of U.S. patent application Ser. No. 11/433,062, filed May 11, 2006, entitled "SYSTEMS AND METHODS FOR IP AND VOIP DEVICE LOCATION DETERMINATION," which claims benefit from U.S. Provisional Patent Application No. 60/680,190, filed May 12, 2005, entitled "iPOSI RECEIVER FOR DEEP IN-BUILDING SIGNAL ACQUISITION AND GPS PSEUDORANGE CAPTURE," the entire disclosure of which is incorporated by reference herein.

FIELD OF THE INVENTION

The present invention relates to systems for determining positions of network-attached devices in general and, in particular, for determining positions of devices connected to asynchronous networks and capable of receiving signals from Global Navigation Satellite Services (GNSS). The invention has particular application for determining positions of Voice Over Internet Protocol (VoIP) devices connected to the Internet and capable of receiving signals from the Global Positioning System (GPS).

BACKGROUND OF THE INVENTION

Global satellite navigation fulfills pervasive needs. Initially a service for military and general aviation, Global Navigation Satellite Services (GNSS) are expanding into many commercial and consumer products for applications ranging from casual to emergency services. More recently cellular phones have been developed that provide location based service applications and, in response to government requirements, emergency caller location services. The preponderance of these services is enabled by the US Air Force managed Global Positioning System (GPS). GPS is now or may soon be joined by several additional GNSS systems including: Glonass (Russia), Galileo (European Space Agency) and QZSS (Japan). Cellular phone embedded GPS uses the cellular network as an assistance tool to forward current and predicted satellite orbital parameter data to reduce the satellite signal search burden. This is useful in ordinary phones that are equipped with chip-scale GPS receivers that can use other signal processing, RF and computational processing elements already inside these phones. The assistance method provides a substantial reduction in the time to initially acquire a position fix by reducing the search field and by limiting the search to where the overhead satellites are known to occupy distinct frequency and code-phase zones of the signal search area. Mobile assisted GPS is the backbone of positioning devices for Emergency 9-1-1 (E911) calls in the United States, and in 2005 supported an estimated time-urgent 100 million E911 calls.

The utility of exact positioning cannot be overestimated when safety and security is involved, and several governments now seek precise location for their respective countries' public communication and first-responder infrastructure. At the same time that they seek this service, their public communication infrastructure is shifting rapidly from fixed circuit switched networks to Voice Over Internet Protocol (VoIP) networks. However, current IP networks are not geo-referenced to either intelligently route or pinpoint the location of E911 callers. Further, VoIP is a service that has portable or nomadic connectivity. VoIP service providers are also no longer 100% facilities based providers. Therefore, VoIP is often hosted, that is supported technically, across facilities with no linkage administratively between the facility or access and the VoIP service providers. Additionally, no single current provider has a network plant with a reach of VoIP service that covers all the geographical points at which VoIP subscribers connect.

To support the ability to locate the VoIP-enabled emergency caller, proposals have been offered to manually survey or map the underlying fixed plant assets. This method may have limited effectiveness, would require service suspension if the user connects at a new location, and would incur additional mapping costs when the user connects at a new location. Other proposals to use parasitic methods by acquiring and mapping signals such as WiFi or TV broadcast signals. Some have proposed entirely new, dedicated signals, using separate spectrum and infrastructure, deployed for the sole purpose of locating objects, pets or people. A common belief or premise of these proposals is GPS cannot operate successfully to reach receiver points located inside buildings and homes due to limits of effective satellite signal sensitivity. This limitation is often attributed to the fact that the satellites are far away and have comparatively limited transmission power.

SUMMARY OF THE INVENTION

The present invention relates to systems for determining positions of network-attached devices and associated methodologies. In particular, an automated position determination system is provided, which when added inside host equipment operates over standards-based broadband communication networks, that is, it uses those networks in unmodified form. One aspect is that the systems may function over asynchronous networks, including delivery of precise time and frequency via packet signaling which provides the foundation for acquiring weak GNSS signals virtually anywhere, automatically and inexpensively.

One embodiment of the present invention provides a method to precisely position network-connected devices using a specific configuration of specialized servers, which in turn serve a multitude of inexpensive, standardized, position determination edge devices with embedded receivers. These receivers readily embed as silicon components or are fully die-level integrated into a diverse array of commercially available VoIP and IP devices. Consistent with the service feature of VoIP, these devices may be readily moved, and may operate as "nomadic" changing between portable and fixed usage behavior. It is therefore desirable to seamlessly maintain an updated location should consumers move the device to different places. These devices generally attach to networks that do not have a common, precise time and/or frequency reference. When called for by control logic and in response to a programmed set of conditions, each remote receiver may provide and transfer network messages using conventional IP connection and/or packet protocols. Furthermore, these devices interact using conventional streaming packets that provide valuable signals to disseminate time and frequency, which enable remote receivers to align local frequency and time and then capture positioning system signals such as target navigation satellite signals. These signals provide range measurements. The signals are then encoded and sent back to a central server, and once satisfying certain accuracy criteria, are then transferred into an industry standard Location Information Server (LIS) database as part of modern VoIP and IP device location management standards or government regulatory mandates.

Aspects of the present invention provide for extended receiver sensitivity, relative to known commercial GPS systems, in order to acquire weak in-building GNSS signals. Additional aspects are operable to extend the coherent signal integration time, relative to known commercial GPS systems, when signal conditions warrant though acquisition and measurement of single GNSS signal acquisitions events which are later clock-corrected to form a position assembled from time-spread observations. Still further aspects use knowledge of common router connections to combine nearby receiver measurements leading to improved building address position accuracy.

Accordingly, in accordance with one aspect of the present invention, a method for determining the position of a device connected to a computer network relative to a fixed coordinate system is provided. Embodiments of this aspect may include various types of network-attached devices. Such devices may include personal computers and devices with Voice Over Data Network (VODN) capabilities. In one embodiment the device is a VoIP phone. The VoIP phone may be attached to any network connection including an ethernet connection or a DSL or cable connection. VoIP phones are generally stand-alone units that function similar to traditional phones attached to the Public Switched Telephone Network (PSTN) and communicate over asynchronous Internet Protocol (IP) networks such as the Internet. As to the network to which the device is attached, it may be any computer network including asynchronous networks that use industry-standard packet communication protocols and do not supply time or frequency references for attached devices. Such networks may include the public Internet, or private Intranets such as those operated by corporations, institutions or governments. This system may be applied to segments of an interconnected network such as local area networks.

In another embodiment, the device whose location is to be determined may be connected to the network through a wireless access point. In this configuration, the device may refer to the location of the wireless access point as a sufficiently precise location. This is particularly applicable to short range wireless devices, such as 802.11b devices where the device is generally well under 100 meters from the serving access point. In an alternate embodiment, the device or wireless access point may be operable to directly determine the device's location relative to the wireless access point. Under these circumstances, the device may be located based on the combination of the wireless access point position and the location of the device relative to the wireless access point.

In accordance with another aspect, a method is provided for estimating the position of a device relative to a fixed coordinate system through communications over a computer network. The communications may be between the device to be located and a model server. The connection between the network and the device may be a broadband connection, and may be operable to transfer data at a rate of at least about 128 kilobits per second (kbps) bidirectionally. The fixed coordinate system may be a standard system using latitudes and longitudes to fix a position such as those generally used by GNSS systems. Exemplary GNSS systems include GPS (United States) and Glonass (Russia), and currently planned systems Galileo (European Space Agency) and QZSS (Japan).

In accordance with another aspect, the communications route between the model server and the device may serve to help estimate a position of the device. For example, the device or the model server may initiate an IP trace route for the communication path between the device and the model server. This IP trace route would provide information as to intermediate routers in that communication path. This information may then be used by the model server to make an estimation of the device's location based on a known position of routers encountered in the communication path. The knowledge of positions of routers may be obtained by accessing a database containing such information. The database may have been developed by gathering data from previous device location efforts. The database may be a commercial database which the model server accesses through a network connection. This method will generally be able to estimate the position of the device to within 10-100 km of the device's actual position. If the IP trace route reveals a router to which the device is directly connected, where that router's position is known the accuracy of the estimate can be reliably assumed to be within 10-30 km in most urban and suburban areas. The system may tolerate up to a 100 km accuracy but any higher accuracy will enhance convergence time of the signal acquisition process since the estimated parameters will be closer to the true values of the incoming GNSS signals. In another possible scenario, the IP trace route may reveal that the device whose position is to be determined is connected to the same router as a device whose position has previously been determined. In the case of many office buildings, association of shared routers will provide an initial position estimate to within several hundred meters. In this regard, it is an aspect of the present invention, that as more and more devices are located through the present methods, initial estimates of positions may be enhanced due to common router connections.

In accordance with another aspect, the device whose position is to be determined may obtain data over a computer networking regarding signal characteristics of a positioning system relative to an estimated location of the device. The positioning system may be a terrestrial based system, for example a system comprised of transmission towers transmitting signals which can then be used to determine a location, or a GNSS system. The signal characteristics of the positioning system relative to the estimated location of the device may be determined by a model server and transferred to the device over a network connection. The signal characteristics may include such characteristics as the signal frequency calculated to be incident on the estimated location, signal code phase, signal frequency rate of change over time, navigation code bit state, and bit time transition, or other usable carrier signal and modulation characteristics. The model server may determine these characteristics by accessing known providers of such characteristics or by calculating the signal characteristics. The signal characteristics may take into account atmospheric and motion related factors, which may influence the characteristics of the signal incident on the estimated location. For example, the signal characteristics may take into account Doppler carrier frequency shifting effects.

In accordance with yet another aspect, a peering point server may be provided that is operable to communicate with the device over the computer network wherein the peering point server is synchronized with or calibrated to relevant time references of the signal structure of the satellite positioning system. The peering point server may maintain calibration with the positioning system through the reception of signals from the positioning system. In the embodiment where the positioning system is the GPS, the peering point server may receive multiple GPS signals that would enable the peering point server to maintain synchronization with the GPS system. To facilitate this, peering point servers may have sophisticated components (relative to consumer GPS devices) and remotely mounted antennae (for clear viewing of satellites). The peering point servers may also be provided with highly accurate internal timing references to maintain or backup precise synchronization with the positioning system. This may be used as a primary system or as a backup system for when positioning system signals are not available. The internal timing reference, for example, may be an atomic clock and its accuracy may be better than 100 parts per billion as measured against the time reference of the positioning system. In one embodiment, a plurality of peering point servers may be located throughout the region where devices are to be located. In another embodiment, the peering point servers may contain atmospheric pressure sensors. In this embodiment, since the peering point servers would be at a known altitude, the atmospheric pressure sensors in the peering point servers could be used to determine local atmospheric pressure which could then be used to calibrate barometric altimeters that may be located in nearby devices whose precise locations are to be determined. This would lead to the determination of the precise altitude of the devices whose locations are to be determined, which would aid in the location determination process.

In accordance with yet another aspect, a peering point server may be provided that is operable to communicate with a device over a computer network wherein the communications between the peering point server and the device may be used to estimate a position of the device in the absence of the device receiving any signals from a positioning system. This may be accomplished by statistically analyzing characteristics of the signals communicated between the peering point server and the device. This methodology may improve a level of position accuracy obtained by a trace route between a model server and the device. The improved position accuracy may be within 5000 m of the true position of the device. In accordance with still another aspect, a method for calibrating time and frequency references of a device whose position is to be determined is provided. The method includes calibrating the time and frequency references through network communications between a peering point server and the device whose location is to be determined. This communication may occur over an asynchronous network. The communication may be one-way, i.e. the peering point server may broadcast communications to the device and from those communications the device may be operable to determine the proper time and frequency reference or the communication between the device and the peering point server may be two-way. In one embodiment, the device may be in one-way or two-way communication with a plurality of peering point servers to perform the calibrating step of the method.

In accordance with yet another aspect, the device may be operable to align time and frequency elements in a receiver included in the device to the signal characteristics of a least one transmitter of the positioning system. The signal characteristics to be aligned to may have been received by the device from a model server. This alignment, or tuning, in one embodiment may be to signals produced by the GPS system.

In accordance with an additional aspect, a method for receiving a plurality of signals from at least one transmitter of a positioning system is provided. The receiving of the signals may encompass coherently integrating a signal over a period of time greater than about 0.01 seconds, and incoherently integrating signals for proportionately longer periods. Generally, consumer grade GPS systems do not integrate coherently or incoherently over this long of a period of time. The consumer grade GPS systems generally rely on receiving stronger signals to avoid the need for long integration. Additionally, consumer GPS systems are typically mobile or handheld so longer integration times are difficult to achieve since device movement may cause oscillator or timing inaccuracies. In contrast, IP network attached devices are generally stationary and generally do not experience similar movement-caused oscillator inaccuracies. The generally stationary nature of IP connected devices along with accurate signal characteristic determinations made by a model server may contribute to the ability of the device to integrate signals over a longer periods of time, including time periods if necessary longer than about 0.5 seconds.

In addition to extended acquisition times, additional embodiments may provide for methods where GNSS signal acquisitions may take place over an extended period of time. This is opposed to consumer grade GPS systems, which generally must simultaneously receive enough signals to determine a position fix from the simultaneously received signals. In contrast, embodiments herein provide for a time-spread acquisition of GPS signals. For example, a first satellite signal may be received at time A, and later second, third and fourth satellite signals may be received at a separate time B. The time-spread method disclosed herein may allow for the aggregation of the readings at separate times to establish a position fix. The extent of time-spread may be more than one second. Since the GPS unit may remain stationary and a time reference may be provided by a peering point server, under these circumstances the time-spread may be more than one hour. In an additional embodiment, a plurality of signals necessary to create a position fix may all be received from a single satellite as it transits across the field of view of the device. For example, in one embodiment, a signal may be received from a satellite in a first position and since the receiving device is provided a time reference from a peering point server, a pseudo-range from the satellite in the first position may be obtained. At a later point, a second signal may be received from the same satellite but in a second position. At the second time, a second pseudo-range may be obtained. Similarly, a third pseudo-range may be achieved when a satellite is in a third position. These three signals may then be aggregated to determine a position fix for the device, which has remained stationary during the signal aggregation period.

In accordance with a further aspect, a method for determining the position of a device relative to a fixed coordinate system based on a time calibration of the device and a plurality of received signals is provided. Once signals have been received according to the methods described herein, and the received signals have been calibrated to the time reference of the positioning system, calculations similar to those known by those skilled in the art of positioning systems may be utilized to determine a final position. This final position will generally be accurate to within 50 m of the true position of the device and in many circumstances may be far more accurate. Wherein as more signals may be received over time after the additional position fix, more accurate position fixes may be possible. In this regard, an initial position fix may have an accuracy within 200 m of the true position of the device when combining network and satellite signal pseudo-ranges. In such a circumstance, continued acquisition of positioning system signals may lead to the position eventually being fixed to within an accuracy of 50 m.

It is a further aspect of the current invention that the calculations necessary to determine a position fix may be performed by a model server or other system in communication with the device over the computer network. According to this aspect, the device would transmit its received satellite signals along with a timestamp or information as to the accuracy of its clock at the time those signals were received to a model server. The model server may then calculate, based on this data, the position of the device. The model server may then store the determined position in a database which correlates the device to its determined position. In another embodiment, the calculations necessary to determine a position may be performed at the device itself. In this embodiment, the device may then report to the model server its position and then the model server may record the device's position into a database. As noted earlier, the received satellite signals may be from a single satellite that has transited across the field of view of the device or may be from multiple satellites.

In accordance with yet another aspect, a method is provided for reporting and electronically readable device identifier and device location information for a device. In one embodiment, after the device's position has been fixed the device may store that position fix locally. In one embodiment when certain communications are initiated, such as an E911 call, the device may report its location to the recipient of the call. In the case of an E911 call, the reporting of the location may be to the emergency call center that ultimately receives the E911 call. In yet another aspect, when an E911 call is received by an E911 switch or call center, the switch or call center may interrogate a database containing location information for network-connected devices according to the present invention to learn the location of the device from which the E911 call was initiated. The call may then be promptly forwarded to the proper emergency services dispatch center along with that location information.

In accordance with still another aspect, a method of verifying a previously determined position of a device connected to a network is provided. This aspect of the present invention includes determining a position of a device and gathering a first set of information regarding the attachment of the device to a network. This first set of information may include information gathered by a peering point server in the process as described above of calibrating the time reference of the device to peering point server. The first set of information may also include information gathered in the IP trace route performed to gain an initial estimation of the position of the device as described above. In this aspect, once a request for location information of the device has been received, for example, the request may be generated during an E911 call, the verification method may include generating a second set of information containing the same type of information as the first set of information and comparing the first set of information to the second set of information. If the comparison shows that a predetermined amount of similarity exists between the two sets of information, the position of the device may be verified as being the same position as was previously determined. This aspect of the invention allows for a quick verification of the position of a device without going through a positioning system signal acquisition and calculation cycle. This aspect may also be used to verify the position of devices at generally regular time intervals to ensure that information within a location database is accurate. In one embodiment, the information may include the packet mean time delay between the peering point server and the device. In another embodiment, the data may include the packet time delay distribution between the peering point server and the device. In yet another embodiment, the information may include trace route information. The information may include various combinations of the above-mentioned information types.

In accordance with an additional aspect, a method of selecting a process of determining the position of a device connected to a computer network is provided. This aspect may include estimating a position of a device according to aspect previously discussed, obtaining data regarding characteristics of signals of a positioning system as discussed above, and attempting to receive signals based on the obtained data. This aspect further includes then determining the quality of a plurality of signals from the positioning system and, based on the determined quality level, selecting between at least two methods of position determination. The first method may be where, as described above, the receiving device is calibrated to the positioning system time reference through the computer network. A second method may be where the time reference of the positioning system is obtained from the positioning system itself. The second process would be similar to those generally used by consumer GPS devices wherein the need for an accurate time reference in the device is obviated by simultaneously acquiring multiple signals from the positioning system.

In accordance with yet another aspect, a method of placing an E911 call is provided. In this aspect, an emergency telephone number is dialed from an IP device connected to an IP network wherein the IP device is operable to receive signals from a positioning system such as the GPS. This is followed by connecting the IP device to the PSTN through the IP network and then connecting through the PSTN to an emergency services network and providing a location of the IP device to the emergency services network. This is followed by selecting an appropriate emergency services dispatch center based at least in part on the provided location and transmitting the location information to the selected emergency services dispatch center and connecting the caller to that emergency services dispatch center. In one embodiment the interconnection between the IP network and a switched network is through an IP network to PSTN gateway. In another embodiment the interconnection is made through a media Gateway. In another embodiment the provision of the location includes interrogating an IP device location database and in still another embodiment, the provision of the location is accomplished by the IP device providing the location information directly to the emergency services network.

In accordance with a further aspect, a method for calculating a position of an IP device attached to a computer network is provided wherein the method includes receiving at the server over a computer network an indication from an IP device to initiate a location routine, performing and IP trace route between the server and the IP device to assist in estimating a position for the IP device, sending signal characteristics to the IP device regarding characteristics of signals from a positioning system that may be incident on the IP device, receiving signals at the IP device from the positioning system, and calculating a position of the IP device based on the received signals.

In accordance with still another aspect, a method is provided for determining the position of a first device where an adequate position determination may not immediately be made from the signals being received at the first device. This aspect utilizes multiple devices connected to the same edge device of a computer network to make a position determination. For example, a device on a first side of a building may only be able to receive signals from a single satellite and a second device in the same building but on an opposite second side may be able to receive signals from multiple satellites. The current aspect of the invention would allow the signals received by the first and second device to be aggregated to produce a position determination which would generally approximate a midpoint between the two devices. Since the midpoint between these devices may be toward the center of the building, the eventual location determination may be more accurate as to the building itself, providing, for example, emergency service providers with a more robust address determination.

In another aspect, an apparatus is provided that includes a network interface module, a signal receiving module, a frequency and time aligning module, and a timing module. The network interface module may be capable of packetizing data and sending those packets over an IP network and also to receive packetized data and reassemble the received packets. The signal receiving module may be operable to receive signals from a positioning system. The positioning system may be a GNSS system such as, for example, the GPS. The frequency and time aligning module may be operable to obtain the frequency and time aligning information over a connection to the network via the network interface module. The timing module may be operable to calibrate a time reference of the apparatus to an external time reference, where in the calibration is performed over a network via communication through the network interface module. In one embodiment, the apparatus includes a processing module for processing signals received by the signal receiving module in order to determine a position of the apparatus. In another embodiment, the apparatus includes a barometric pressure sensor to assist in determining the altitude at which the device is located. In an additional embodiment, the apparatus is a VODN unit. In yet another embodiment, the apparatus is a VoIP unit such as, for example, a VoIP phone.

In accordance with yet another aspect, a VoIP phone is provided wherein the VoIP phone includes a voice conversion module operable to convert voice to data and data to voice, a signal receiving module for receiving signals from a GNSS such as the GPS, and a frequency and time aligning module for aligning the signal receiving module, a timing module for calibrating the time reference of the VoIP phone to the time reference of the GNSS, and a processing module for processing signals from the GNSS. In one embodiment of the aspect, the frequency and time information used in the frequency and time aligning module is obtained by the VoIP phone through a connection to a network via the network interface module.

In accordance with another aspect, a system for use in determining a position of a device connected to a network relative to a fixed coordinate system is provided. The system may include a device connected to a network that is operable to receive signals from a positioning system, a model server in communication with the device over the network and a peering point server in communication with the device over the network. In this aspect, the model server may be operable to provide to the device information regarding the signal characteristics of transmitters of the positioning system and a peering point server may be operable to calibrate the time reference of the device to a time reference of the positioning system. In one embodiment, the positioning system is a GNSS, such as the GPS. In another embodiment, the model server is operable to determine an estimate of the location of the device through communications with the device. In an additional embodiment, the model server receives information from the device regarding the signals received by the device and from the signals is able to determine a position of the device. In yet another embodiment, the model server includes a database wherein a plurality of positions are recorded correlated to a plurality of devices attached to the system. In one particular embodiment, the device is a VoIP phone. In another particular embodiment, the network is an asynchronous network. The asynchronous network may be an IP network.

Further areas of applicability of the present invention will become apparent from the detailed description provided hereinafter. It should be understood that the detailed description and specific examples, while indicating a preferred embodiment of the invention, are intended for purposes of illustration only and are not intended to limit the scope of the invention.

BRIEF DESCRIPTION OF THE DRAWINGS

For a more complete understanding of the present invention and further advantages thereof, reference is now made to the following Detailed Description taken in conjunction with the accompanying drawings, wherein.

DETAILED DESCRIPTION OF THE INVENTION

In the following description, the invention is generally set forth in the context of a Voice Over Internet Protocol (VoIP) device attached an Internet Protocol (IP) network receiving signals from the Global Positioning System operated by the U.S. military (GPS). Indeed, the invention has a number of benefits and provides useful results in this regard. However, it will be appreciated that various aspects of the present invention are not limited to VoIP devices, IP network applications or systems receiving signals from the GPS. Accordingly, the following description should be understood as exemplary of the invention and not by way of limitation.

The determination of the location of a device connected to a computer network is useful in many regards. To achieve this determination, a device is provided herein that is capable of receiving signals from a positioning system and interfacing with a computer network. Aspects of a device having such capabilities will be described along with various network resources to aid in the determination of the location of the device. Various methodologies describing the interaction of the device with the various network resources to achieve a determination of the location of the device will be illustrated. Also, detailed descriptions of technical features will be provided.

Figure 1:
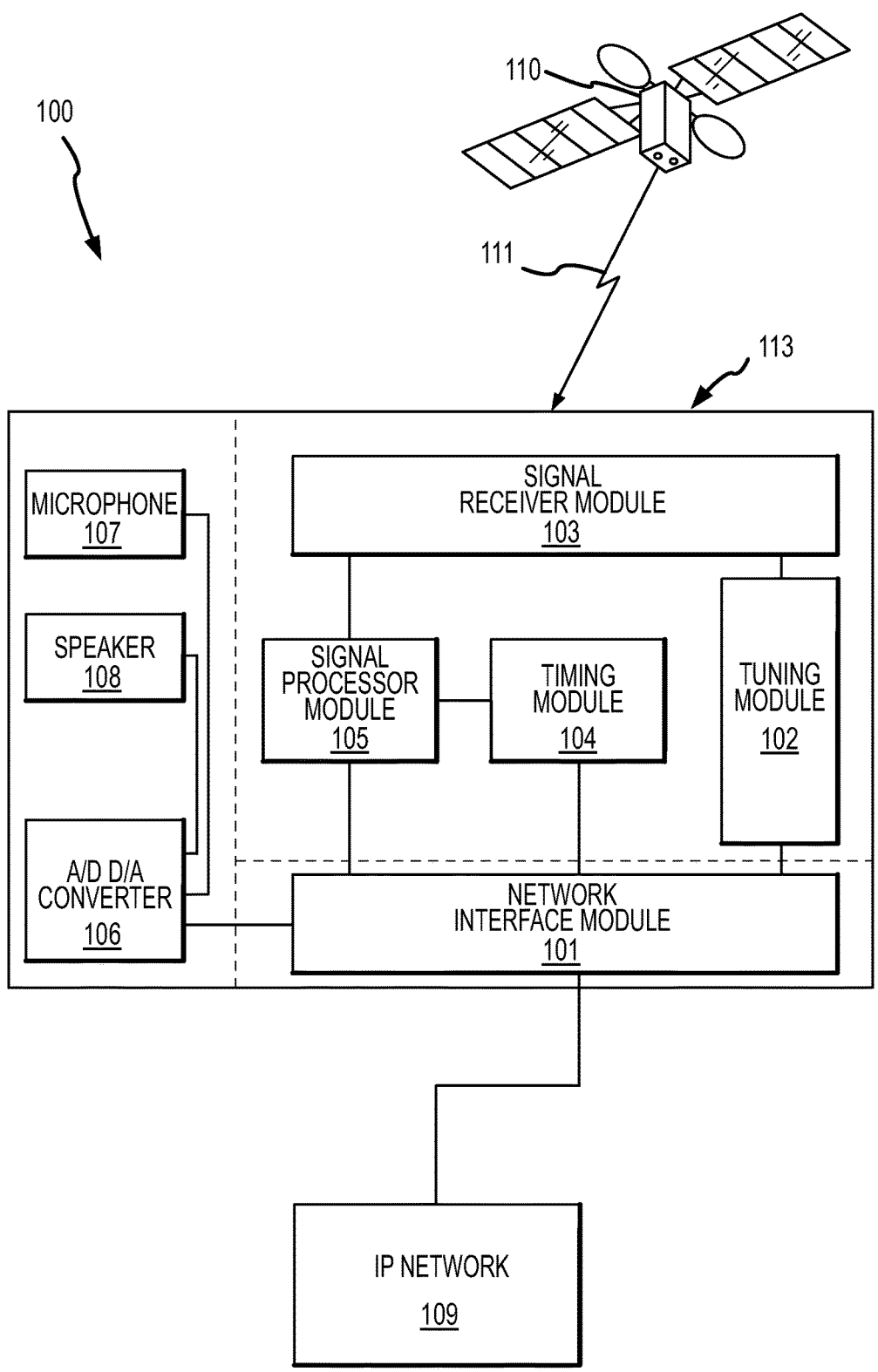
FIG. 1 is a schematic diagram illustrating a VoIP phone including a signal receiver module and network interface.

FIG. 1 is a schematic diagram of one embodiment of a device (in FIG. 1 the device is a VoIP phone 100) capable of interfacing with an IP network 109 and receiving signals 111 from a positioning system (in FIG. 1 the positioning system is represented by the GPS 110). The positioning system may be any system that transmits signals 111 that can then be received by the VoIP phone 100 and used to determine a location of the VoIP phone 100. Such a positioning system may be the GPS 110. Although in general, embodiments discussed herein will be described as receiving signals from the GPS 110, it should be appreciated that other positioning systems may be utilized. For example, other Global Navigation Satellite Services (GNSS) systems such as those currently planned to be deployed by the European Space Agency and Russian and Japanese governments may be used (Galileo, Glonass and QZSS respectively). Alternatively or in conjunction with a GNSS system, ground-based transmitters could also be used.

The IP network 109, may be any computer network capable of linking the VoIP phone 100 to the remotely located elements of the positioning system described below. Of particular note is the system's ability to function while interconnected across asynchronous networks. Indeed, the system's ability to function using the Internet to interconnect various components of the system is of significant benefit. Although in general, embodiments discussed herein will be described as communicating over the Internet, it should be appreciated that the system is capable of communicating over other types of computer networks and that the use of the Internet in the description should be considered exemplary and not limiting.

In FIG. 1, the exemplary device is a VoIP device such as a VoIP phone 100. Traditional communications over telephone lines utilize the Public Switched Telephone Network (PSTN). Phone calls made over the PSTN generally involve activating switches within the PSTN to provide a dedicated circuit between the parties of the phone call. In contrast, the Internet is an IP network wherein information to be sent over the network is divided into packets or packetized. A simplified sequence of events that take place during a phone call using a VoIP phone 100 may be as follows. Audio input, such as the speech of a caller is converted to electrical energy by a microphone 107 contained within the VoIP phone 100. This electrical energy will be in analog form and is converted into digital form by an A/D converter 106. The digital signal may then be divided and packetized by a network interface 101. Each packet of data will contain information as to its destination. The packets of data are then sent out over the IP network 109 wherein various routers will read the destination information of the various packets and forward the information accordingly. Eventually the packets of information will arrive at a destination where they will be reassembled in their original order and converted to analog signals. The analog signals will be sent to a speaker (similar to speaker 108 of the VoIP phone 100) where they will be converted to audio signals for the receiver of the call to hear. If the receiver is attached to the PSTN, a gateway will be required between the Internet and the PSTN to enable the Internet attached caller to communicate with the PSTN attached call receiver.

Although the device depicted is a VoIP phone 100, it should be appreciated that the device could be any network device including any Voice Over Data Network (VODN) unit where it would be desired to know the location of the network device. For example, if the device were leased or rented equipment, the lessor may wish to track the whereabouts of that equipment and could do so using an embodiment as disclosed herein. Knowing the location of a computer attached the Internet could assist users in searching for local resources such as doctors, stores, government offices, etc. Such a device could also be capable of alerting an owner or authorities of the location of the device if it were to be stolen and then connected to the Internet. The device could be a remote sensor, for example, a weather sensor or seismic sensor, in which case the sensing data could be automatically correlated to the sensor's location.

A location determination module 113 may be included in the VoIP phone 100. The module 113 may include a tuner module 102, a signal receiver module 103, a timer module 104, and a signal processor module 105. The location determination module 113 may contain circuitry and logic so as not to disrupt the normal operation of the VoIP phone 100 since as will be described shortly the location determination modules operate at times when the VoIP phone 100 is not active in higher priority tasks, such as processing and trans-coding or translating voice packets. In this sense, the VoIP phone 100 would incorporate or "host" the location determination module 113, as a subsidiary system which functions exclusively as a location determination sub-system, using certain shared hardware, interfaces, micro-processor, digital signal processor, memory, power supply and other circuit or logic elements appropriate to save circuit replication cost where appropriate or desired.

The signal receiver module 103 may be operable to receive signals from the GPS. For simplicity and cost considerations, the signal receiver module 103 may be a single channel receiver capable of tracking a single satellite at any given time. Alternatively, the signal receiver module 103 may be a multichannel receiver capable of tracking two or more satellites simultaneously. The signal receiver module 103 may include an antenna. The signal receiver module 103 may also filter incoming signals as instructed by the tuner module 102.

The tuner module 102 may be operable to receive information regarding available satellite signals. The information may originate from another system attached to the IP network 109 and be forwarded to the tuner module 102 through the network interface 101. The information may contain data regarding signal frequency, signal code phase, frequency rate of change over time, navigation code bit state and bit time transition. This information may then be used to enable the signal receiver module 103 to lock on to the targeted signal.

Once a targeted GPS signal has been received, the signal may be processed by a signal processor module 105. The signal processor module 105 may timestamp received signals, wherein the timestamp information is provided by a timer module 104. This process is described in greater detail below. The VoIP phone 100 may then forward information related to the received and timestamp signals to another system attached to the IP network 109 for determination of the location of the VoIP phone 100. Alternatively, the signal processor module 105 may contain the capability to determine the location of the VoIP phone 100 based on signals received from the GPS and then send location data to other systems over the IP network 109.

As shown, the tuner module 102, signal receiver module 103, timer module 104, and signal processor module 105 together make up a location determination module 113. In general, the location determination module 113 has dedicated RF, signal filter, oscillator, and certain baseband hardware, interface circuits and software program logic, all of which forms a remote GPS Pseudo-Range Capture Receiver (PRC) to measure known incoming GPS signals and extract the pseudo-range time (that directly relates to time of flight from satellite to the receiving device).

Other components may be present in the VoIP phone 100. For example, as is typical with telephones, the VoIP phone 100 may include a numeric keypad for inputting numbers to be dialed and a display for displaying incoming or outgoing call information. A memory unit may also be present to store user or device information or information related to the location determination process.

Figure 2:
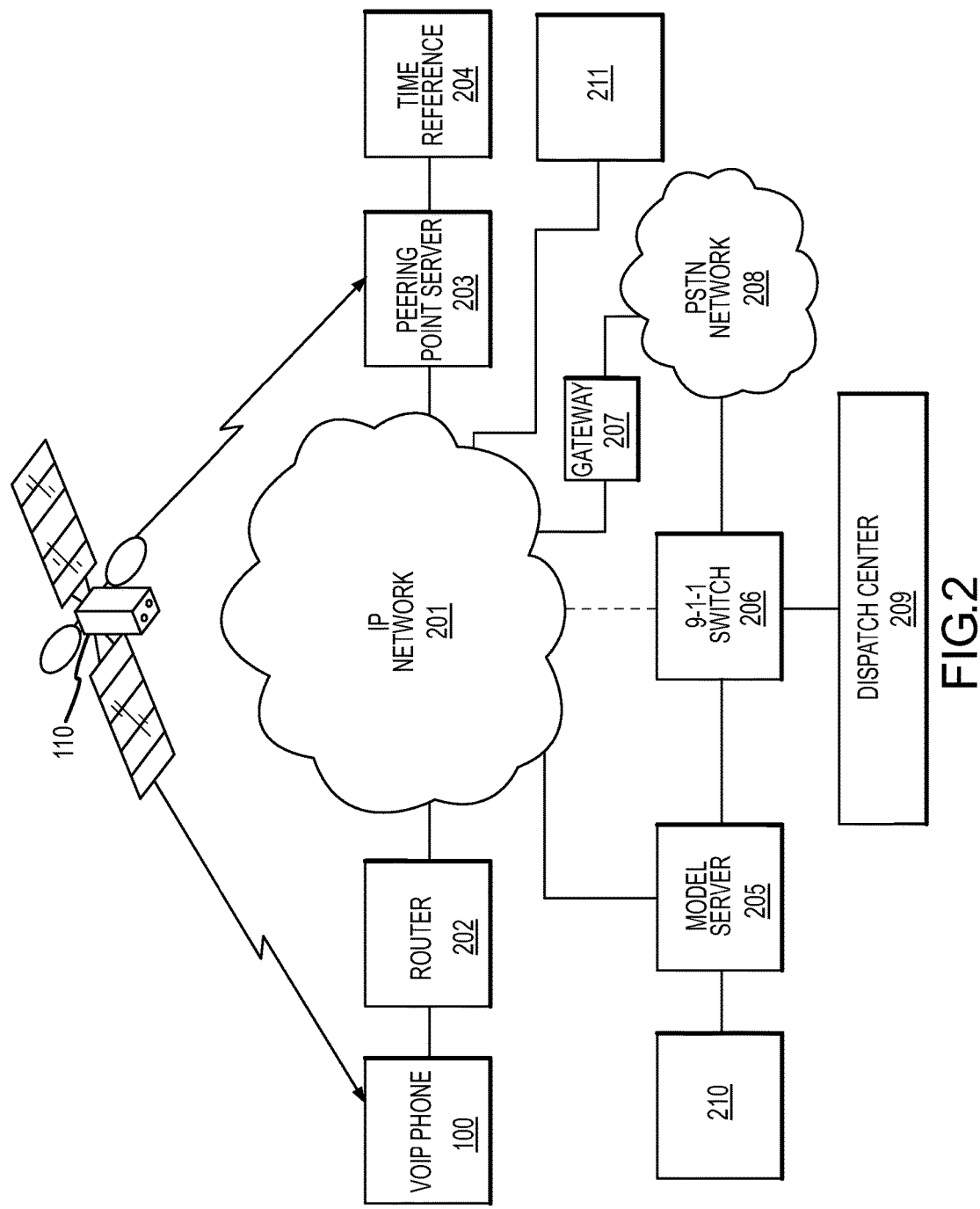
FIG. 2 is a schematic diagram illustrating a system of locating a device connected to a network and receiving signals from a positioning system.

FIG. 2 illustrates a VoIP phone 100 as part of a system for use in determining the location of a network-connected device as deployed in a private or public interconnected network. The VoIP phone 100 connects to the packet data network through common IP network connections to the public Internet through one or more routers 202. The routers 202 may be a cascaded set. FIG. 2 shows a typical route between the end-device (the VoIP phone 100) and other peers or servers all similarly connected, and as such form a public IP access IP network 201, or Internet, as it is conventionally described in the art. As illustrated, the VoIP phone 100 may also receive signals from the GPS represented by a satellite 110.

As noted above, the tuner module 102 of the VoIP phone 100 may receive information regarding GPS signals which the VoIP phone 100 may attempt to receive. This information may come from a model server 205 attached to the IP network 201. In general, there may be many individual model servers 205 attached to the IP network 201 to provide the services described herein. The functions described herein as being performed by the model server 205 may all be performed by a single model server 205 performing all the described tasks, or may be performed by several individuals specialized servers which together make up a model server 205 as depicted herein. The ultimate number and configuration of servers needed to perform the model server 205 functions will be dependent on the number and distribution of devices requiring information from the model server 205 and the number of functions having to be performed by the model server 205.

The model server 205 may contain or have access to a variety of information that enables the precise positioning of the VoIP phone 100. This information may include GPS satellite position data and GPS satellite signal data. Also, model server 205 may also contain or have access to a database that links components attached to the IP network 201 with their physical locations. For example, the data may include router addresses and physical locations of those routers, the location of other devices that have had their positions determined by the present system, and information regarding characteristics of communications over the IP network 201 with the VoIP phone.

The information regarding the location of routers and other devices that have had their positions determined by the present system may be used by the model server 205 to generate an approximation of the location of the VoIP phone 100. This can be accomplished by performing an IP trace to identify routers used in communication between the model server 205 and the VoIP phone 100. This process is described in detail below. Once a general location of the VoIP phone 100 is determined, the model server 205 may determine the optimal satellite signals to be used by the VoIP phone 100 in the location determination process. This information is then sent over the IP network 201 to the tuner module 102 of the VoIP phone 100 for use in tuning or calibrating the signal receiving module 103.

As described above, the VoIP phone 100 may receive and timestamp satellite signals from the GPS. This information may then be forwarded to the model server 205 where it may be processed to determine the location of the VoIP phone 100. This arrangement allows the processing of the incoming pseudo-range and resulting location data to be centralized at the model server 205 and allows the end-devices whose location is to be determined to be of relatively limited function, which may reduce cost.

Once the location of the VoIP phone 100 has been determined, the model server 205 may place that information into a database. The information within the database may then be accessed for a variety of purposes including the dispatching of emergency services to the location of the VoIP phone 100, law enforcement, or commercial Location Based Services (LBS). Access may be through a device, or interface, 210 directly connected to the model server 205 or through another device, or interface, 211 in communication with the model server 205 through the IP network 201. The model server 205 may also be operable to communicate with a 9-1-1 switch 206 either directly or through the IP network 201.

As noted above, the VoIP phone 100 may timestamp signals received from the GPS. Similar to the reasoning described above in relation to the centralization of the processing of location information by the model server 205, a time keeping function may also be centralized at a peering point server 203. The function of the peering point server 203 may be to maintain and disseminate timing information relative to the GPS. Generally, it is more efficient to synchronize remote devices over the IP network 201 when the devices to be synchronized are in physical proximity. As a result, many peering point servers 203 may be positioned throughout the physical area in which VoIP phones 100 are to have their positions determined. For example, to provide location information for VoIP phones 100 located in the United States, many peering point servers 203, including possible multiple peering point servers 203 in a particular metropolitan area, may be positioned throughout the United States.

The peering point servers 203 may be operable to disseminate time information synchronized with the GPS. To do this, the peering point server 203 may be synchronized with GPS time. This may be accomplished by an initial synchronization wherein subsequent synchronization with the GPS is maintained with another high-stability reference such as an atomic clock 204. Synchronization between the peering point server 203 and the GPS may also be accomplished through the reception of GPS signals by the peering point server 203 or a GPS-referred timing device attached to the peering point server 203. In this case, a high-stability reference may serve as a backup time keeping system. Through methods discussed in detail below, the peering point server 203 may synchronize with the VoIP phone 100 through communication over the IP network 201.

To assist resolution of altitude and reduce the minimum number of satellite paths that must be recovered to establish a position fix, remote measurement of barometric pressure may be employed. In this case, the peering point server 203 may also include an atmospheric pressure sensor. Since the peering point server 203 may be placed in a fixed location of a known altitude, the atmospheric pressure sensor may provide a reliable baseline measurement to calibrate and offset variation in measured atmospheric pressure due to local atmospheric conditions. The measured pressure variation could then be used to calibrate altimeters in proximity to the peering point server. The VoIP phone 100 may also be equipped with an atmospheric pressure sensor. In view of the fact that the peering point servers 203 may generally be in proximity to the VoIP phone 100, peering point server 203 pressure measurements may be used to help determine the altitude at which atmospheric pressure sensor equipped VoIP phones 100 are located. This process can differentially correct the air pressure readings to accurately resolve VoIP phone 100 altitudes to within 3 to 5 meters based on proximate peering servers, sampling and updates.

Traditionally, emergency calls such as 9-1-1 calls are routed through the PSTN 208 to a 9-1-1 switch 206. One function of the 9-1-1 switch 206 is generally to route 9-1-1 calls to the proper emergency services dispatch center 209 for the location from which the call originated. Generally, this is done by referencing a database in which the PSTN 208 telephone numbers are associated with locations. This PSTN database is generally maintained by the PSTN companies or service providers. However, one of the features of the VoIP phone 100 is that it can be moved from Internet connection point to Internet connection point and still function using the same telephone number. Therefore, the location of the VoIP phone 100 is incapable of being maintained in the same database using the same methods traditionally associated with the PSTN 208.

Since, as described above, 9-1-1 switches 206 are generally connected to the PSTN 208, emergency calls made from the VoIP phone 100 must be routed through a gateway 207 between the IP network 201 and the PSTN 208. Since there may be no information regarding the VoIP phone 100 in the PSTN database, the 9-1-1 switch 906 may interrogate a model server 205 database, as described above, to determine the location of the VoIP phone 100. The communication between the 9-1-1 switch 206 and a model server 205 database may be a direct connection or an IP network 201 connection. Alternatively, the VoIP phone 100 may transmit its location information directly to the 9-1-1 switch once it has been connected. Once the 9-1-1 switch 206 obtains location information for the VoIP phone 100, it can then route the phone call from the VoIP phone 100 to the proper dispatch center 209 along with corresponding location information for the VoIP phone 100.

Although the above description is generally in the context of calling 9-1-1 over a VoIP phone 100 attached to an IP network 201 and receiving signals from the GPS, it should be appreciated that the scope of this invention is not limited to such components. That is the above discussion may apply to any network-attached device where the location of the device is desired or a precise timing reference is desired. Similarly, any GNSS or terrestrial based system may be used by the system to determine the location of the network-attached device. Similarly, the system may function over any network and need not be limited to any particular IP network or the Internet.

Figure 3:
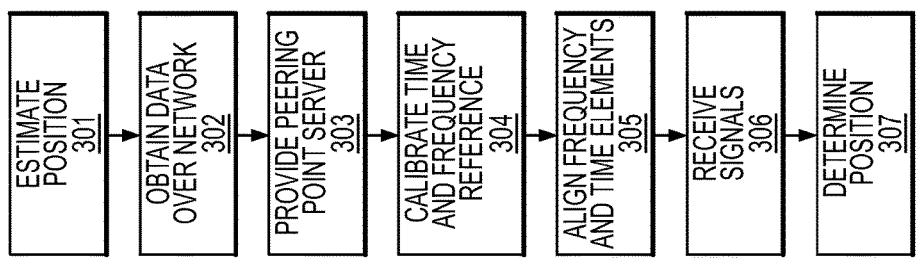
FIG. 3 is a flowchart for a method of determining position of a device connected to a computer network relative to a fixed coordinate system.

FIG. 3 illustrates a methodology of determining the location of a device connected to a computer network relative to a fixed coordinate system in an alternative implementation of the present invention. The illustration is in the form of a flowchart wherein the first step is to estimate 301 the location of a device relative to a fixed coordinate system to a first level of accuracy by communicating over a computer network with a model server. As in the previous illustrations, the present method will be described generally in terms of a VoIP phone capable of receiving signals from the GPS and communicating over the Internet. Also as noted above, it should be appreciated that this is for exemplary purposes only and should not be interpreted as limiting the scope of the invention.

The device may be a VODN device capable of converting voice inputs into a form capable of being transferred over a data network. The device may be a VoIP device such as a VoIP phone wherein voice inputs are converted into data packets capable of being delivered across an IP network such as the Internet. In general, devices such as VoIP phones will be connected to an IP network through a broadband connection capable of transferring at least 128 kbps bi-directional.

The computer network may be asynchronous or any network that uses packet data communication techniques that lack explicit, inbuilt mechanisms to transfer a time or frequency to devices attached to the network.

The fixed coordinate system may be the coordinate system of a GNSS such as GPS or GLONASS or a proposed GNSS such as Galileo or QZSS. The method may estimate a location relative to a single GNSS or apply signals from multiple GNSSs. The coordinate system may also be a terrestrial based system such as a localized system including, for example, multiple land-based "pseudo-lites", or signals emanating from local transmission towers. The terrestrial based system may be GNSS synchronized. To aid in the location process, the device may incorporate atmospheric pressure sensors to be used in determining the altitude of the device.

The estimation 301 may include a position task routine, where a trace route sub-task is commenced. A trace route sub-task incorporates methods known to those skilled in the art to send a stream of User Datagram Protocol (UDP) or other packets to a known destination IP address over the Internet. The purpose of the trace route is to identify all IP-addressable devices, typically routers that are between the sites. As intermediate routers are encountered packets are designed to route back to the source while others continue toward the next router repeating the echo process with each intermediate router upstream from the source. Individual packets can be measured with each echoing intermediate return for the quality of the route as well as the round trip delay. The main purpose of this process is to inform the destination address, in this case a model server. The model server uses this information to search at least one router database for a coarse geographical reference related to the device. Those routers that are closest to the device are used to approximate the device location. The searched router database may be a commercially available database containing routers and their physical locations. The approximate location of the device based on this commercially retrievable reference error tolerance is quite large, 30-100 kilometers, and may be deduced from previous trace route occurrences and database lookups.

The searched router database may also be a database created from knowledge gained through repeated location determination of devices according to the present method. For example, if a first device whose location is unknown is found to be directly connected to a router that in turn is directly connected to a second device whose location is known, the estimation uncertainty can be greatly reduced to generally less than one kilometer.

Using trace route information, a coarse location of the device is established to a first level of accuracy. The next step is for the device to obtain 302 data over the computer network regarding estimated signal characteristics of the incoming GPS signals at the location of the device. That is, the appropriate signal model assistance parameters associated with the physical location of the closest geographically identified router to the end-device may be applied. The data is obtained from a model server wherein the model server models and transfers to the device, following appropriate and conventional packet protocols, signal processing assistance information containing known satellite orbital positions (known in the art as ephemeris data) plus signal modulation information that reduces to message parameters the coded modulation and timing characteristics emanating from as well as trajectory information of each satellite.

Although in a present example, the positioning system is the GPS, it should be appreciated that this is for exemplary purposes and any positioning system may be utilized including terrestrial based systems or GNSSs other than GPS, such as GLONASS, Galileo, and QZSS.

Specifically provided in the assistance data is each available satellite's Doppler, code-phase timing, navigation bit timing and bit status. Some or all of this data may be derived from commercial GNSS reference data suppliers (one exemplary source is RX Networks, Vancouver, BC Canada) designed to reliably deliver at near real-time, high accuracy satellite reference data parameters to sites around the globe. In another embodiment, local reference stations that are located within the same country or region could supply this data. Since global operability is contemplated, global network operations centers may be present and essentially the same solution and data importation procedures may be carried out in those centers around the world.

Also based on the estimation of the location of the device, the model server may assign an appropriate proximate primary and secondary peering point server to facilitate the synchronization process described below.

Once an estimation for the location of the VoIP phone has been generated, the model server may provide the appropriate signal model assistance parameters associated with the physical location of the closest geographically identified router to the end-device. The model assistance parameters will normally include orbital ephemeris data for satellites in the field of view of the VoIP phone. For any particular satellite in the field of view of the VoIP phone, the data may include such information as relative signal frequency (Doppler information), signal code phase, frequency rate of change, navigation code bit state, and a bit time transition event marker. The data may take into account expected Doppler shifting and other effects present at the estimated location of the VoIP phone.

The model assistance parameters may vary in accuracy in relation to the accuracy of the estimated location of the VoIP phone. For example, in the case where the VoIP phone whose location is to be determined is attached to the same router as another device of known location, the signal model assistance parameters may be generated under the assumption that the VoIP phone is within short distances, perhaps within tens or several hundred meters of the other device of known location. Under such circumstances, the signal model assistance parameters may be more precise than in a situation where the estimation process provides valid estimates up to about 100 kilometers between the device and the reference site (e.g. the geo-referenced router).

The model server may also be capable of determining which satellites within the field of view of the VoIP phone may be capable of providing the most valuable location information. That is, when multiple satellites are within the field of view of the VoIP phone, the model server may be capable of determining which satellite signal, if received, would enable the most accurate location determination. This selection may also include selecting elements from various GNSSs or terrestrial systems.

The next step is to provide 303 at least one peering point server attached to the IP network. The peering point servers, as previously described, may be synchronized with the GPS system and may be at least frequency and time referenced to each GNSS system. The next step is to calibrate 304 a time and frequency reference of the VoIP phone with a time and frequency reference of at least one peering point server. This is accomplished through communications between the VoIP phone and at least one peering point server over the IP network. Either the model server or the VoIP phone may initiate the calibration process between the VoIP phone and at least one proximate peering point server. Once initiated, a calibration stream task launches precisely inter-departing packets from the peering point server which are used to mark and symbolize the transferred time interval to the remote device. This transmits the time and frequency reference packet stream across the network segment from the peering point server to the remote receiver device, now bounded by the known IP addresses, verifying a common or stable route in both directions. This procedure also sounds the channel for proper integrity testing. The receiver, e.g. VoIP phone, measures the streamed packet inter-arrivals in the remote receiver. As more samples are gathered, the VoIP phone may test the statistical distribution formed by a large number of samples for integrity of the transferred time and frequency process.

The results of these tests are then compared to distribution integrity criteria suitable to estimate the mean delay to within a suitable error criterion. If the criterion is not met, the process may be re-initiated. If the criterion is met, the next step may be to test for convergence, or the rate of increased estimation resolution of the mean reference interval delay based on the packet stream inter-arrival delay samples. If this falls within the criteria for appropriate rate of convergence, measurements of the refined mean delay are made. The same decision step may also trigger drawing the most current model server assistance data.

Once the refined mean interval is determined, assistance data frequency and scaling information to create the proper reference clock reference to calibrate the remote receiver is applied. The synchronization of a remote device with the peering point server over an asynchronous network is an important aspect and is described in greater detail below. The process may include passive calibration by the VoIP phone where the calibration process is done solely through the reception of signals from a single peering point server. In another embodiment, the calibration process may involve reception of calibration signals from multiple peering point servers. In yet another embodiment, the VoIP phone may be calibrated through two-way communications between a single peering point server or multiple peering point servers.

By calibrating the VoIP phone to the peering point server which in turn is synchronized to the GPS, the VoIP phone may be calibrated to the GPS. This may eliminate the need to derive the time reference with the GPS from the GPS signals and therefore improve position performance or efficiency. The peering point servers may be synchronized with the GPS time through any means known to those skilled in the art. Methods of synchronization may include synchronization through reception of GPS signals at the peering point server, equipping the peering point servers with highly accurate timekeeping devices, or a combination of GPS signal reception and internal timekeeping. The peering point servers may include, for example, an atomic clock capable of accuracy greater than 100 ppb as measured against time reference of the GPS clock.

As noted above, the peering point servers may include pressure sensors for use in calibrating pressure sensors of VoIP phones in proximity to the peering point servers. If so equipped, the peering point server may determine the local atmospheric pressure and use this information to calibrate proximate VoIP phones containing pressure sensors. This calibration information can then be used to determine the altitude of a VoIP phone.

The next step of the process illustrated in FIG. 3 is to align 305 frequency and time elements of the VoIP phone to the signal characteristics of at least one of the GPS satellites as per the signal characteristics provided by the model server. The precision of the signal characteristics provided by the model server is dependent on the accuracy of the initial estimation 301. That is, the more accurate the initial estimation 301, the more accurate the frequency and time elements.

After the VoIP phone has aligned itself with expected frequency and time elements emanating from at least one of the GPS satellites, the next step is to receive 306 signals being transmitted by at least one of the GPS satellites. The VoIP phone may initially attempt to receive a single signal emanating from a single GPS satellite. Alternatively, the VoIP phone may initially attempt to receive frequency and time elements of multiple signals emanating from multiple GPS satellites.

As noted above, the model servers may have provided an estimation of the signals from the GPS system that should be incident on the VoIP phone. This relatively accurate estimation of signals combined with the mostly stationary nature of VoIP phones, allows for the VoIP phone to more narrowly focus and dwell longer on a targeted GPS signal than conventional mobile GPS devices. Stationary devices are not subject to the same oscillator inaccuracies and drift as mobile devices experience when the mobile devices are in motion. Generally, coherent integration times of greater than 0.01 seconds can be utilized. If required, the coherent integration time may be over a time period greater than about one half second. Accordingly, cumulative coherent and non-coherent times can be similarly extended to increase sensitivity.

A common case is that the VoIP phone is located inside a building, where too few simultaneously available satellite signals arrive to resolve a point-position. Since the VoIP phones are normally not mobile (or in the case of wireless, the access points are stationary), the VoIP phone may receive the signals necessary to fix a position over an extended period of time. This method also allows improved accuracy by extending observation time to capture more satellites at different geometrical positions to produce higher quality position fixes. The VoIP phone may cumulatively compile more time-spread measurements when as few as one GNSS satellite signal is available per acquisition attempt. This process of compiling time-spread measurements may, for example, take place over a time period greater than about one hour. This process is described in greater detail below. In the early stages of this process, it may be possible to make a determination of a location to an intermediate level of accuracy, wherein the intermediate level of accuracy is a level between the original estimation based on the IP route trace, and a final location accuracy. The intermediate level of accuracy may be within 50-200 m of the actual location of the VoIP phone.

The following step may be to determine 307 the position of the VoIP phone relative to the fixed coordinate system used by the GPS. This determination is made based on the received signals of the previous step using methods known to those skilled in the art. For example, since by virtue of the calibration step, the time of flight of the signals received from the GPS can be determined, and since the signals travel at a known rate, the distance between the GPS satellites and the VoIP phone can be determined, thus leading to a position determination. Generally, GPS devices are capable of both receiving signals and making the calculations necessary to translate those signals into a location determination. In the present system, these functions may be separated. Both the VoIP phones and the model servers may have the capability to process the signal data received by the VoIP phones to make a location determination using methods known to those skilled in the art. Alternatively, the signal processing capabilities may only be present in the model server or only present in the VoIP phone.

After the position determination is made for the VoIP phone, an additional step may be to report the VoIP phone position information. This reporting may be done to a database where such information is generally stored. This reporting may be to a component of a 9-1-1 call handling system or it may be performed as part of connecting an emergency call from the VoIP phone to an appropriate emergency call center. The position determination information may also, or alternatively, be stored in the VoIP phone itself (after server processing) so that the VoIP phone may provide this information. This information may, for example, be provided to an emergency services dispatch center during an emergency call. This information may also be provided to other devices in proximity to the VoIP phone so that those devices may utilize or contain position information.

As noted above, the preceding description generally discussed embodiments in relation to a VoIP phone for exemplary purposes. An alternate embodiment may be where the device to be located is a wireless device. In the case of a short-range wireless device, the position of the wireless access point used by that device may be used as the position of the wireless device itself. Under these circumstances, the steps described above would be performed at the wireless access point. Where the position of a wireless device may be ascertained relative to its corresponding wireless access point, a more accurate position of the wireless device may be obtained by combining the position information for the wireless access point and the wireless devices location relative to that wireless access point.

Figure 4:
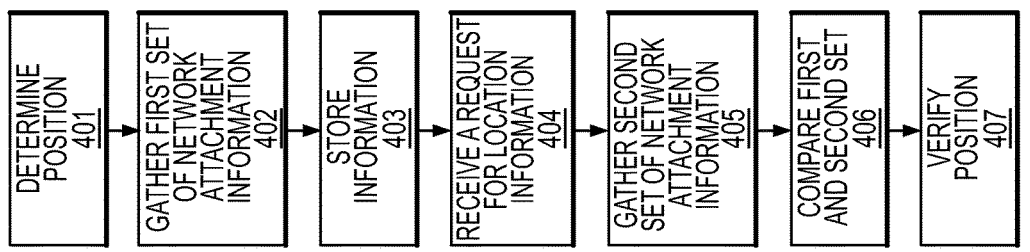
FIG. 4 is a flowchart for a method of verifying a previously determined position of a device connected to a network relative to a fixed coordinate system.

FIG. 4 is a flowchart for a method of verifying a previously determined position of a device connected to a network relative to a fixed coordinate system. The first step of this method may be to determine 401 the position of a device relative to a fixed coordinate system. This may be done according to the method described above in relation to FIG. 3. Alternatively, the position determination may be performed using standard GPS techniques. Indeed, the position determination can be performed by any method known to those skilled in the art.

The next step may be to gather 402 a first diverse set of information regarding the characteristics of the attachment to the network that are indicative of the attachment at the determined position. The set of characteristics may include such characteristics as the mean time delay of data packets sent from a peering point server to the device, the distribution of the time delay of data packets sent from a peering point server to the device, and trace route information between a peering point server and the device. Together these characteristics form a "fingerprint" indicative of a unique connection to a network. These characteristics are then stored 403 for later retrieval. The storage may be at the device, a peering point server, a model server, or any other appropriate location.

The following step may be to receive 404 a request for location information of the device. This request may be generated in a plurality of ways. For example, a model server may generate such a request at regular time intervals to ensure the accuracy of information in a database which correlates devices to locations. The device itself may generate the request after a specific event, such as going through a power cycle. A third party or device may generate the request such as a request by an emergency services dispatch center for the location of the device or a request by law enforcement officials for the location of the device.

Once the request has been generated, the next step may be to gather 405 a second set of information regarding the same attributes gathered in step 402. This may be followed by comparing 406 the first set of information to the second set of information. If the comparison results in surpassing a predetermined threshold of characteristic similarity, the position of the device may be verified 407 to be the originally determined position of step 401.

As described earlier, it is possible that embodiments of the present invention may take minutes or even hours to determine the position of a device. In an emergency situation, it may be necessary to provide position information immediately. The present method provides a process by which a previously determined position can be quickly verified and/or a database of positions can be kept updated using a minimal amount of processor capacity (when compared to the process of determining a position based on satellite signal acquisitions).

Figure 5:
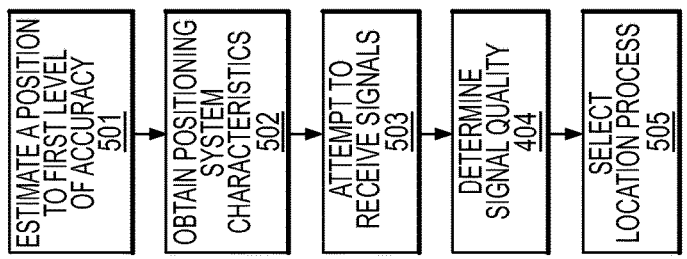
FIG. 5 is a flowchart for a method of selecting a process of determining the position of a device connected to a computer network relative to a fixed coordinate system.

FIG. 5 is a flowchart for a method of selecting a process of determining the position of a device connected to a computer network relative to a fixed coordinate system. The first step of this method is to estimate 501 a position of the device relative to the fixed coordinate system to a first level of accuracy. This estimation is done by communicating over a computer network with a network operations center. The network operations center may have a database of locations of other devices on the computer network. By tracing the communications between the network operations center and the device, the position of the device may be estimated based on known locations of devices present in the communications route between the network operations center and the device. The network operations center need not be a single computer or at a single location. Its function may be distributed between several computers located at various locations.

The next step is for the device to obtain 502 data over the computer network regarding characteristics of a positioning system relative to the estimate position of the device. This is followed by attempting 503 to receive a plurality of signals of a positioning system. This is followed by determining 504 the quality of the plurality of signals of the positioning system.

The quality of signals may be placed into one of two broad categories. The first category is where the quality level of the signals is of a high enough quality level so that the device may within a reasonable time gather enough signals from the positioning system to determine the position of the device. Generally, this would mean that the device is able to acquire signals from four separate transmitters of the positioning system generally simultaneously.

The second category is where the quality level of the signals is not of a high enough quality to facilitate the generation of an accurate position determination through the capture of multiple signals simultaneously. Under these circumstances, the position determination may need to be made by gathering signals from the positioning system over an extended period of time. This may be accomplished by calibrating the time and frequency reference of the device as previously described.

Once the quality level of the positioning system signals has been determined, the next step is to select 505, based on the quality level, between determining position based solely on signals received by the device (in the case of the first category) and determining position based on signals received by the device and a calibrated time and frequency reference (in the case of the second category).

Figure 6:
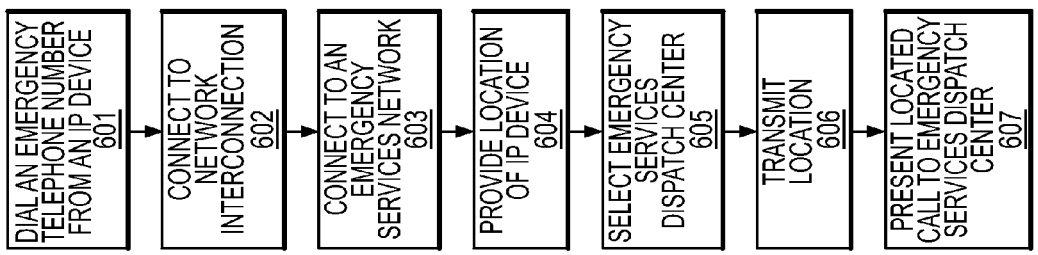
FIG. 6 is a flowchart for a method of placing a telephone call from an IP device connected to an IP network to an emergency services dispatch center.

FIG. 6 is a flowchart for a method of presenting a located call from an IP device, capable of receiving signals from a positioning system connected through an IP network, to an emergency services dispatch center. The first step of this method is to dial 601 an emergency telephone number from an IP device connected to an IP network which generates a call. "Dial" as used herein means any method known to those skilled in the art of initiating a phone call, including, but not limited to, pressing 9-1-1 on a keypad, using a preprogrammed speed dial feature or using a voice-recognition feature. The next step is to connect 602 the IP device to a network interconnection capable of interconnecting an IP network to a PSTN. The connection between the IP device and the network interconnection is not a true connection in the sense that no dedicated line exists between the two devices. This part of the eventual link between the IP device and an emergency services dispatch center will be through the IP networking and hence be made up of packetized data transferred between the IP device and the network interconnection.

The network interconnection may be an IP network to PSTN gateway, a media gateway, or any other interconnection known to those skilled in the art. The network interconnection serves a function of receiving, ordering, and converting the packetized data from the IP device into an analog signal capable of being transported across the PSTN.

It also serves a function of packetizing the analog signal from the PSTN for transport over the IP network to the IP device.

After the connection is established between the IP device and the network interconnection, the IP device is connected 603 to an emergency services network attached to the PSTN. The emergency services network may be a 911 switch or other system for routing IP network calls to appropriate emergency service dispatch centers. The location of the IP device may then be provided 604 to the emergency services network. Based on the location of the IP device, the emergency services network may then select 605 an appropriate emergency services dispatch center. The emergency services network may then transmit 606 the location of the IP device to the appropriate emergency services dispatch center and then present the located call to the emergency services dispatch center 607. The order of presenting 607 and transmitting 606 may be reversed or may occur simultaneously.

The step of providing 604 the location of the IP device to the emergency services network may be accomplished in a variety of ways. For example, the emergency services network, upon receiving a communication from an IP device, may interrogate a database containing a correlation between IP devices and the locations of those IP devices. Another exemplary method is where the IP device itself provides its location to the emergency services network.

Figure 7:
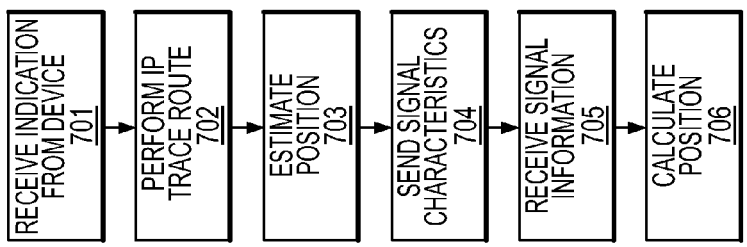
FIG. 7 is a flowchart for a method of calculating a position of a device attached to a computer network.

FIG. 7 is a flowchart for a method of calculating a position of a device attached to an IP network. The first step of this method may be to receive 701, at a server, over an IP network a request, or position task invocation, giving an indication from a device attached to the IP network to initiate a location routine for the device. The indication from the device may be generated by, for example, the device being plugged into a network connection or going through a power cycle.

Once the indication to start a location routine has been received, the next step may be to perform 702 an IP trace route between the server and the device. This IP trace route will return to the server a list of intermediate servers between the server and the device. The server may have access to geographical information about the intermediate servers between the server and the device and from that information a position of the device may be estimated 703. The server may have access to ephemeris data for a GNSS system and be operable to send 704 signal characteristics of the GNSS system that may be incident at the estimated position of the device. The device may then align a signal receiver to those signal characteristics, receive the GNSS signals and send this data to the server. Accordingly, the next step may be to receive 705 from the device information about at least one signal from the GNSS system received by the device.

The server may then calculate 706 a position of the device based at least in part on the signals received by the device. This information could then be sent back to the device so that the device itself can contain its location information. The position information could be used to populate a database. The database may be contained within the server or may be remote from the server. If a position determination was previously made for the device, the task may be truncated, since oftentimes the device position will not have changed, as may be the case, for example, where the location routine was initiated in response to a temporary power loss at the device. Under such circumstances, the truncated process may not include the step of performing 702 an IP trace route.

Figure 8:
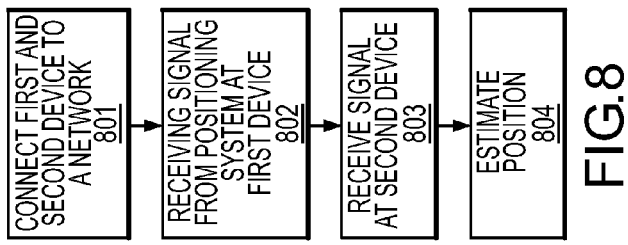
FIG. 8 is a flowchart for a method of determining position of a first device connected to a computer network relative to a fixed coordinate system.

FIG. 8 is a flowchart for a method of determining position of a first device connected to a computer network relative to a fixed coordinate system. This method is referred to throughout this specification as the long baseline method of position determination, wherein long baseline refers to receiving signals at physically distinct locations and combining the results from physically distinct locations and thereby improving the quality of signals or geometry to include a fuller sky view. The first step of this method is to connect 801 a first device and a second device to an edge device of a computer network. Since the first device and the second device are connected to the same edge device there is a high probability that the first device and the second device will be proximate to each other. For example, this may be the case where a first VoIP phone and a second VoIP phone are attached to the same router in an office building. Under such circumstances it is likely that the first VoIP phone and the second VoIP phone are within 200 m of each other.

The next step may be to receive 802 at least one signal from a positioning system at the first device. For example, to continue the example above, this may be where the first VoIP phone is able to receive signals from only two satellites of the GPS. The next step may be to receive 803 at least one signal from the positioning system at the second device. To continue the example above, this may be where the second VoIP phone is able to receive signals from two other satellites of the GPS. In this situation neither VoIP phone on its own may be capable of determining a position. However, between the two VoIP phones, they are receiving four satellite signals which is generally enough to determine a position. Therefore, the next step may be to estimate 804 the position of the first device relative to the fixed coordinate system based at least in part on a signals received by the first device and signals received by the second device.

A position determined by the present method may not be as accurate as a position determined where all the signals are received by a single device. However, the position determined by this method when generally insufficient signals are available at the first device would be more accurate than a position determination based only on signals received at the first device. Returning to the example, two VoIP phones on opposite sides of a building may each be able to receive signals from two GPS satellites. By combining the signals from these two devices a position fix generally centered about the mid point between the two devices may be obtained and may be of value in locating either one of the devices in an emergency situation.

Aspects described herein may be compatible with Industry Standards Internet Engineering Task Force (IETF) which the North American Number Association (NENA) designates as the so-called i2 and i3 reference diagrams and are incorporated herein by reference in their entirety. The purpose of the reference diagrams is to develop standard interfaces having data message and protocols that offer multi-vendor compatible solutions through open and physically distributed communications. By conforming to these standards, or providing interfaces which conform to these standards, embodiments described herein may be fully compatible with existing and future communication and location systems and databases.

The following sections of this detailed description describe in greater detail aspects of the communication between various elements discussed above along with detailed descriptions of methods and apparatuses related to signal processing aspects.

Figure 9A:
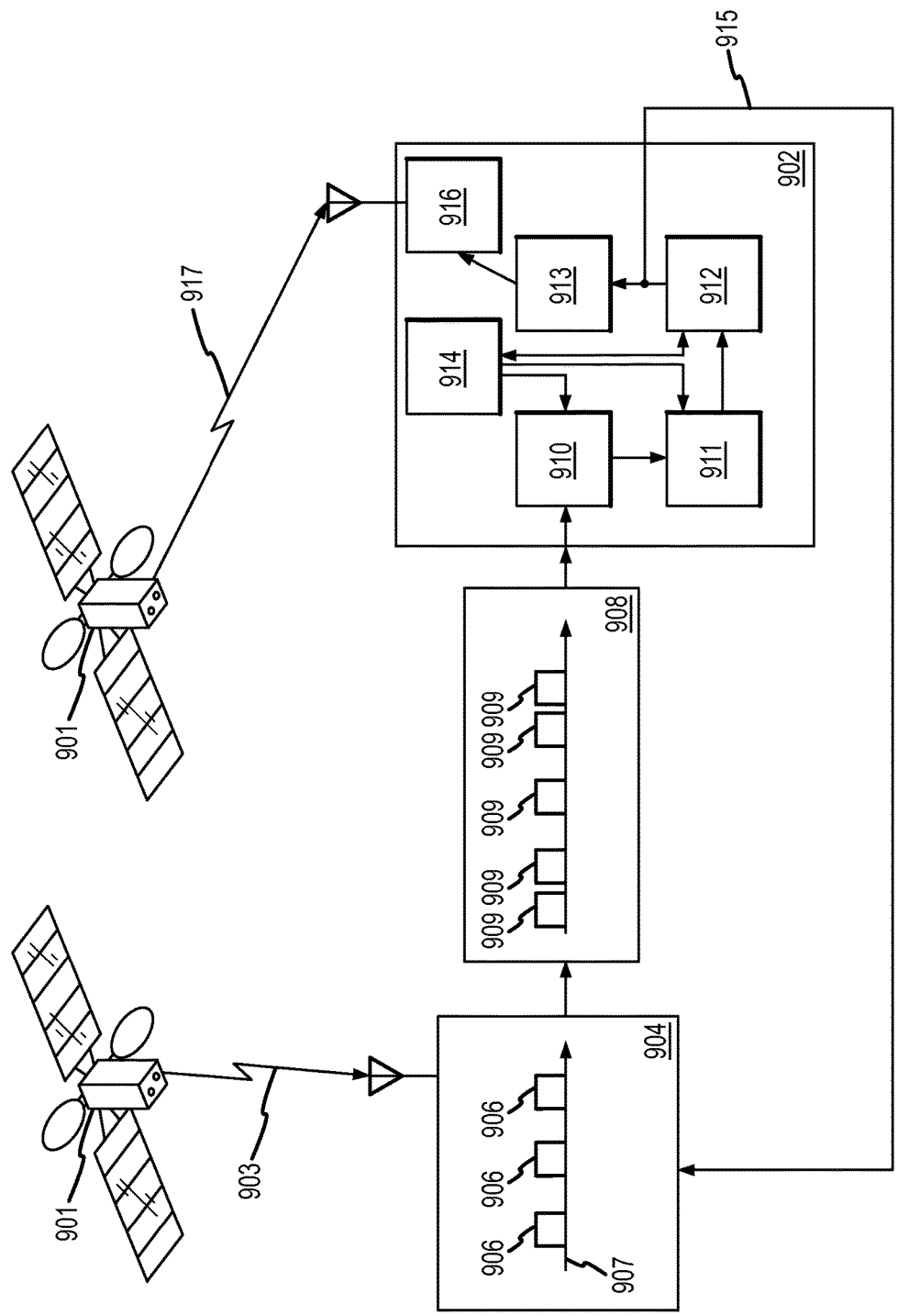
FIGS. 9A and 9B are a schematic diagrams illustrating a system of calibrating time and frequency across an asynchronous network.

FIG. 9A provides a schematic overview of methods of precise frequency and time synchronization over asynchronous networks.

GNSS satellite 901 offers an exemplary source of high precision time, which is widely used to synchronize distributed communication, measurement and control systems. In this case the system uses satellite time as a time transfer or time and frequency dissemination reference to calibrate an end receiver 902. The GNSS signal 903 is received by peering point server 904. The peering point server may include a high quality reception site with at least one external antenna and at least one commercial reference receiver. GNSS signals may serve as a system wide means to synchronize all such uniform packet generators within the peering point servers 904. Individual packets 906 (three shown) are precisely placed at a prescribed time interval, represented by the even spacing along a time axis 907, associated with the known resources of the one-way channel between the peering point server 904 and the end receiver 902.

As packets 909 transit across the open, interconnected IP network along a routed network path 908, the reference time interval regularity is altered due to interaction with other traffic transiting the IP network, and the packets 909 individually lose their original interval time regularity due to the impact of shared traffic at the end receiver 902. Various strategies are known to those skilled in the art to overcome and correct for these time perturbations.

The random time interval fluctuations, or noise, first is recognized when the packets are physically reconstituted, that is received, reassembled and validated by the end receiver 902. Multiple categories of time interval corruption arise depending on the level of contending traffic also transiting across some or all of the same network elements as the measurement stream. Other factors include the available bandwidth of the interconnecting IP network segments, and the random electronic signal fluctuations arising in all packet-handling elements. All but the last effect impact the transit delay and inter-arrival interval across a wide variation of possible transit and inter-arrival delays (as a multiple of the packet size plus inter-packet guard band time).

A disassembly and conditioning module 910 disassembles each packet and marks its relative arrival time based on a local clock 914. Experimental data shows that the inter-arrival intervals can vary but are ascribed primarily to two fundamental sources, contention delay due to background traffic and random jitter arising from each packet-handling device and transmission device connected across a series circuit between the transmitter and receiver. The disassembly and conditioning module 910 can also use a sense of wide and narrow variation time-interval delay to reject the widely varying arrival samples presented to it, leaving the narrowly varying random fluctuation intervals to be handled by a mean estimation and filter module 911, which determines the local "apparent" mean and associated variation about the mean. The wide inter-arrival time variations have a value several times the mean delay value (relative to a steady state value of transit delay) and are by virtue of their excess delay readily discriminated from the narrow variations found much closer to the mean time interval.

In recovering the mean time interval, the disassembly and conditioning module 910 acts as an adaptive filter, typical of those found in the art, first establishing a baseline interval delay from which a flexible or fixed threshold accept/reject delay determination can accept or reject subsequent samples that exceed a threshold. The threshold is not chosen arbitrarily. It is chosen to avoid losing excess samples (network emulation experiments show less than 5% of samples up to sustained traffic contention of 25% of system occupancy). It must also be set such that it does not contribute an excess statistical bias of many samples of mean delay interval. The latter case based on experimental data indicates that the random electronic jitter remains stable and is virtually unaffected by the transient nature of packet contention and loss, that is the two effects are mutually independent mechanisms. While the traffic loads can vary quite unpredictably, random "micro-jitter" variation remains stable and once filtered by the disassembly and conditioning module 910, leaves an expected superimposition of random delay to the mean estimation and filter module 911. Presenting the mean delay, plus the statistical inter-arrival delay variation to a remote clock recovery and adherence module 912. This module 912 essentially provides an accurate estimate of the mean delay by taking in all random and mean samples and comparing the phase, or time advance or time retarding values relative to the local clock 914.

This mean delay or error is then applied to a phase or frequency lock loop to then provide a scalable output frequency, from the end receiver 902 which is proportional to the input voltage of the filter, creating an output frequency. This output frequency is then divided by a known amount and fed back to the phase comparator of the remote clock recovery and adherence module 912. The difference in phase between the incoming and feedback divided replica of the voltage controlled oscillator, which has a frequency based on the local clock 914 is then brought into conformance or agreement with the incoming packet signal. To reduce error of the target precise time interval estimate, many incoming sample intervals are applied to the feedback system. The exact number of samples is based on knowledge of IP connection channel, and the necessary precision sought to meet a target stability and receiver integration time. Evidence of stability is obtained from the error signal within the feedback system.

The filter output within the remote clock recovery and adherence module 912 provides a signal fluctuation rate based on a fixed or adaptive time constants, which can be dynamically set. Filtering adaptively offers flexibility between setting the response of the feedback system for faster convergence (typically desirable at the start of the convergence process, when the transmit and receive errors are the greatest), and taking more samples to shift a relatively steady state response (toward the end of the process as the system approaches what could be described as steady state or equilibrium).

The output frequency value and digitized bit stream signal at the output of the remote clock recovery and adherence module 912 eventually reach a practical equilibrium value. This value practically means when the remote clock recovery and adherence module 912 output matches the transmitted value to within a tolerable difference and therefore provides a usable reference value for calibrating or governing the end receiver 902 at a precise value, which calibrates (or governs) frequency synthesizer 913 as part of the end receiver 902 local oscillator located inside the GNSS Pseudo-range Capture (PRC) receiver 916. In one embodiment, the feedback loop low-pass filter between the phase detector and voltage controlled oscillator in the remote clock recovery and adherence module 912 offers a gauging or control signal 915. This provides a conventional method of loop lock detection (among other possibilities, this could be implemented as a up/down value feedback through a standard TCP/IP packet bearing control standard information). This detector and control message provide means to acknowledge lock status at the disseminating packet transmitter site, i.e. the peering point server 904, so that signaling message values can be varied until an out of lock decision threshold value is exceeded, which calls anew for re-establishing the same end-to-end transmission and time/frequency transfer process.

Receiver 916 adapts its remote receiver frequency synthesizer to the network delivered frequency reference. The end receiver 902 is directed to dwell on prescribed satellite signal(s) 917 based on selecting assistance data described above. The precision of the reference defines one critical limit of reliably dwelling or integrating on selected GNSS modulated signals (such as GPS L1, using CA coded signals) such that the full coherent integration gain is obtained. The precision relates to creating the longest coherent integration interval through the following equation:

$$f=1/(2*t)$$

Where f=the frequency bandwidth uncertainty allowed within a pre-designated frequency bin and t is the maximum coherent integration interval.

Other limits on the maximum coherent time interval are the stability of the receiver local oscillator and the uncertainty of predicting the satellite Doppler frequency due to inexact coarse estimation of the receiver position. Observing parallel, same-sized frequency bands, or frequency "bins" allows a broader frequency uncertainty region to be observed at once, which is a technique well established in the art to offset these conditions. Maximum coherent integration time is also a function of maximum oscillator drift, mostly induced by temperature changes. To control this effect the oscillator is either isolated from environmental temperature gradients, or is precisely regulated using in the art thermal sensing and compensation circuits or on-board microprocessors and compensation algorithms, which adjust and correct the oscillator frequency output even to very slight temperature changes. Using these methods known to those skilled in the art, the oscillator frequency output may be corrected to a degree that allows the highest sensitivity by extending coherent integration time. Finally, the oscillator must provide sufficiently low phase noise in order to maintain coherent signal tracking. This factor is determined primarily by the quality and cut of the physical crystal oscillator and such oscillators are commercially available.

Figure 9B:
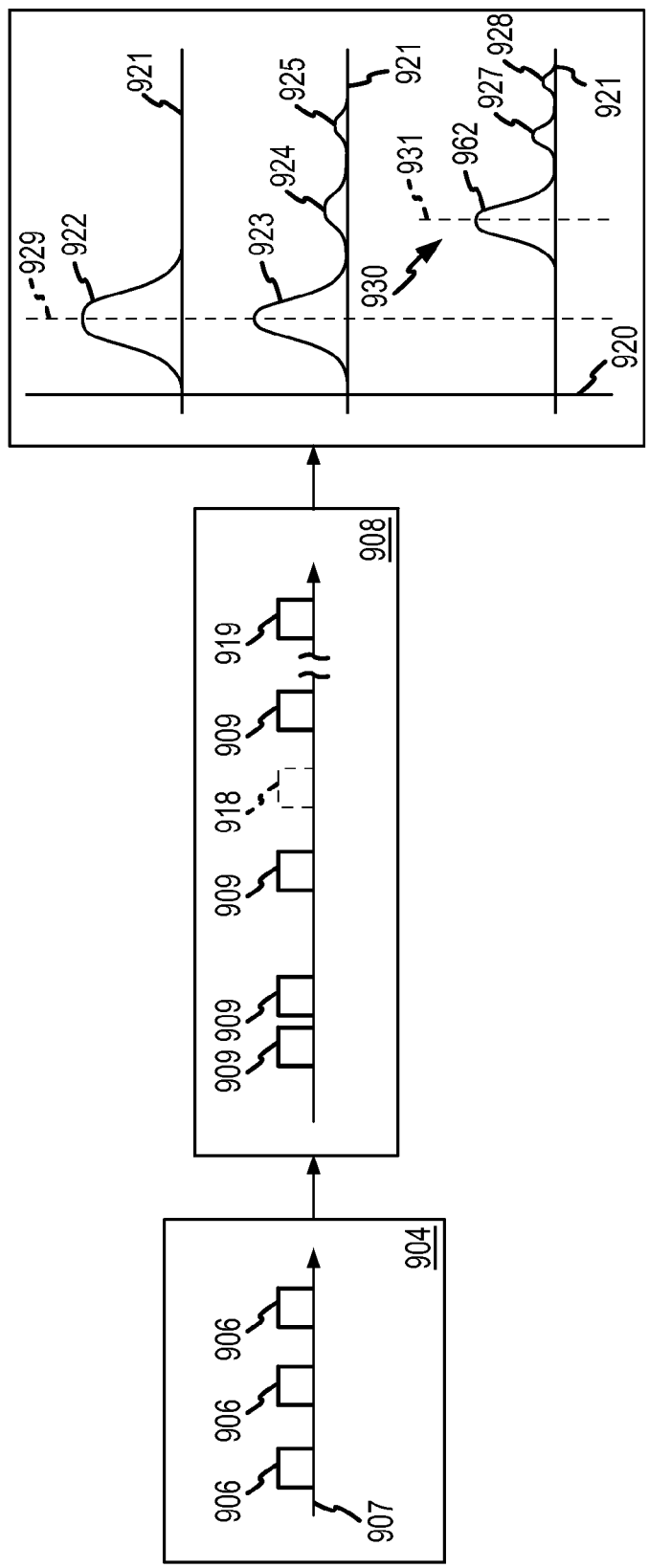

FIG. 9B depicts a schematic based on actual measurements of the general cross-network transmission process in widely deployed IP networks, and the impact of jitter on the packet stream transmission process. Jitter impacts the network-transiting packets in very different ways. The first and most pervasive are quiescent jitter mechanisms. These are random delay fluctuations, which appear and are most accurately observed at the receiver physical ingress point. This point measures the arriving packet time intervals transiting electrically through intermediate active (e.g. switches, routers, repeaters, hubs) and passive (e.g. cable) network elements. More elements add more delay variation, but the contribution to total variation is largely a function of the bandwidth capability of the devices. High bandwidth elements and segments predictably have less random jitter than limited bandwidth segments and devices.

A precisely timed stream of packets 906 departs from a peering point server 904 at precise intervals. As packets transit a routed network path 908 the arrivals deviate from the original departure delays, appearing in the time domain as a near-Gaussian distribution 922 of inter-arrival delays around an additional fixed transit delay 929 relative to the original time of transmission 920.

Another level of jitter occurs when the interval-encoded packet stream interacts with shared traffic transiting parts of the same network. These interactions are also random but create more pronounced delays since they share the same transit time interval. Based on extensive physical layer network measurements, these collisions result in a percentage of packets being deferred to later time intervals, illustrated in FIG. 9B as packet 919 is delayed outside an amount normally associated with the Gaussian delay discussed above. The expected delay of packet 919 is shown in phantom 918. Under contending packet network traffic conditions, collisions occur, which is strongly mitigated but not eliminated by Collision Sense Multiple Access (CSMA) IP network protocols. The residual level of contending packet arrivals are deferred by a readily discernable and much greater amount than the random delay distribution that is experienced in the non-contending case.

These overlap contentions occur most routinely at shared routers or switches which react by moving most shared, time-overlapping packets out to later, proximate time intervals. Under more extreme contention situations some packets will be lost. The deferred time intervals, based on live network measurements, are found to be a strong function of the packet size. The deferred packets experience contention delays that have a characteristic multi-state delay related to the fixed, repeating packet size and its time interval. The traffic-contention distribution 923 shows the characteristic delay distribution, and outlying deferred contention delays 924, 925.

When analyzing these two modes of packet jitter and resulting delay variation, the original, fundamental delay state and delay variation, governed by the quiescent random fluctuations, is essentially unchanged. The outlying contention delays, shown schematically as harmonically related peaks 924, 925 are readily discriminated and rejected due to their large distance from the fundamental delay state. The traffic samples lost in these outlying delay states carry relatively few samples, and therefore lose relatively little information. Actual measurements on representative live networks show a modest 4% sample loss with as much as 25% sustained contending traffic when measuring packet delay variations over representative hop/route network segments. This also shows evidence of time-transfer resilience, little if any increases in mean estimation bias, and suggests a simple process of rejecting outlying inter-arrival delays, delays mostly concentrated in the contention peaks.

For completeness, a case 930 is shown where a stream is suddenly shifted to an entirely different route during the streaming session. This route shift superimposes a delay (relative to the previous delay distributions 922, 923) such that the transiting traffic shifts to a longer network path (the analysis applies equally to longer or shorter routing cases). In this case, the longer route shifts the total path delay, and possibly the random delay variation predictably. The pattern analysis process can either track out to the new transit delay 931, or reject and restart the session. The delay states provide a relatively unambiguous delay profile and thus allow the network packet delay measurement unit to be relatively straightforward to program.

Although described in terms of calibrating time and frequency over an IP network using precisely timed packets, other forms of precise transfer protocols may be used. These protocols may be over local or wide area packet data networks, either synchronous or asynchronous, and may be designed to supply synchronism to a network-connected device. These alternatives include using or enabling embodiments described herein with alternative, multi-application distributed time or frequency methods such as IEEE 1588, Pseudo wire, Circuit Emulation over Packet, or other commercially available precision time and frequency dissemination methods.

Embodiments described herein may also be operable to offer a common precise time and frequency synchronization through a common precise time transfer method similar to that described in this invention. Embodiments described herein may also be operable to provide precise time and/or frequency synchronism signals and services locally for applications such as, but not limited to multi-media high definition video conference services, video content and streaming, IPTV, audio content, audio streaming, and point to point or multi-station conference telephony services that utilize synchronism to provide high quality communications.

The communications between the peering point server 904 and the device 902 may also be used to generate an improved estimate of the position of the device 902 prior to any receipt of signals from the positioning system. As discussed above, an IP trace route (between the device 902 and a model server) may be used to determine the position of the device 902 to a first level of accuracy. This first level of accuracy may be within 30-100 km of the true position of the device 902. In situations where no positioning system signals are readily available, the estimation of position to the first level of accuracy may be improved by analyzing characteristics of the communications between the peering point server 904 and the device 902. This process may include analyzing characteristics such as the communication times between the peering point server 904 and the device 902 to estimate a distance between the peering point server 904 and the device 902. Communications between multiple peering point servers 904 and the device 902 may also be used to assist in the position estimation process. This process may improve the first level of accuracy, prior to any reception of signals from the positioning system, to within 5000 m of the true position of the device 902. In situations where signals from the positioning system are not immediately receivable by the device 902, this improved first level of accuracy may at least allow for an emergency call placed from the device 902 to be forwarded to the proper emergency services dispatch center for the area in which the device 902 is located.

Figure 10:
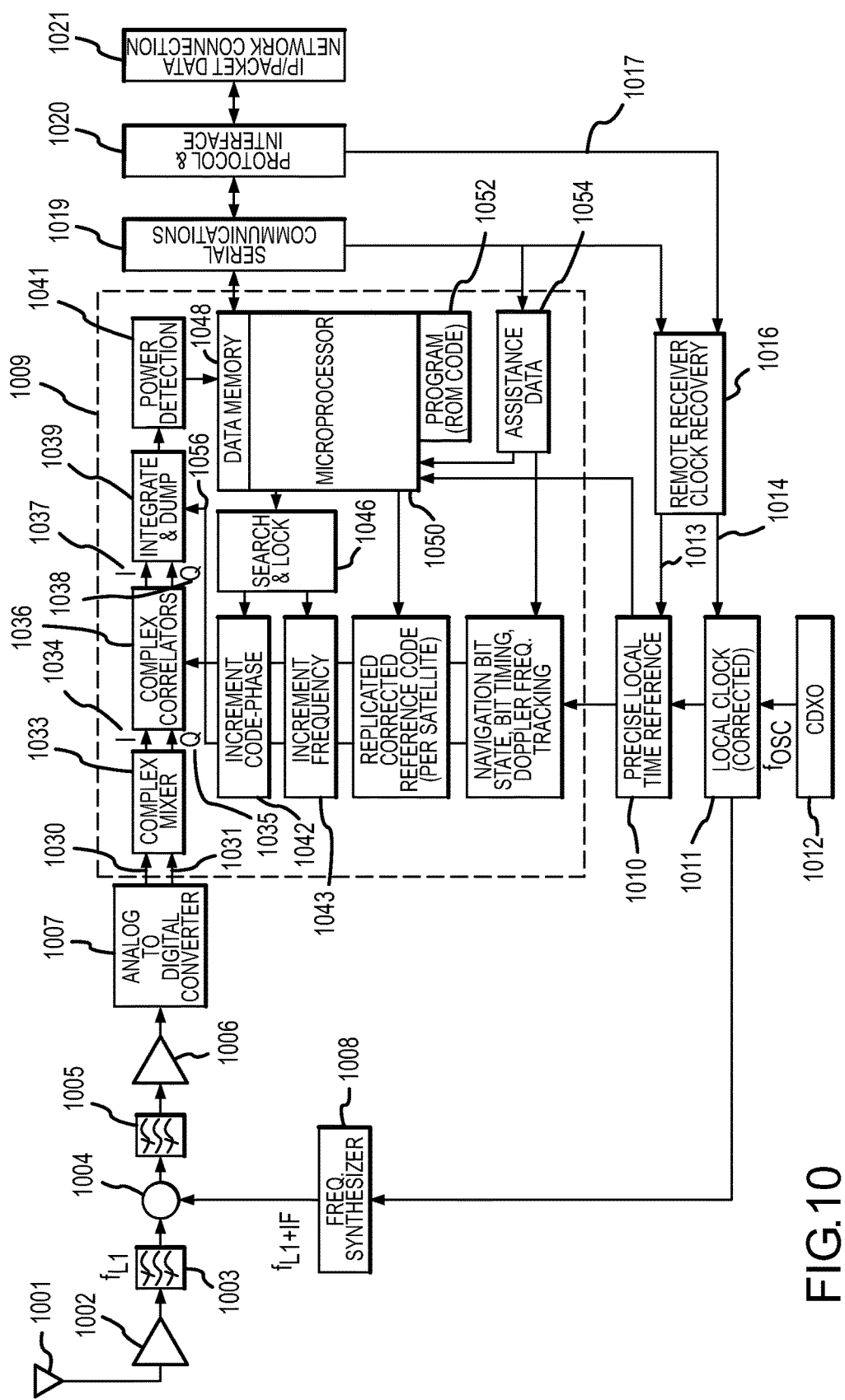
FIG. 10 is a schematic diagram illustrating a device operable to receive signals from a positioning system and to receive time and frequency calibration information across an asynchronous network.

FIG. 10 illustrates the GNSS remote receiver stages that couple, amplify, filter, and down-convert GNSS in calibrated frequency alignment with the incoming GNSS signals.

The remote client receiver antenna 1001 couples the available RF signals from GNSS satellites through a suitable Low-Noise Amplifier (LNA) 1002, of specifications that are commonly practiced for the purpose of elevating signal to judicious levels to in part overcome the loss of RF filter 1003. The RF filter 1003 provides a conventional bandpass response. It rejects spurious signals above and below a nominal center frequency of the GNSS frequency band. RF filter 1003 provides a first order immunity to high out-of-band interfering signals. This filtered signal is then connected to a state of art RF mixer 1004 for further amplification and filtering, then in terms of the modulated signal is shifted down in frequency ("down-converted") by conventionally mixing the incoming GNSS signal with a device having a non-linear transfer function, mixing the signal from the RF filter 1003 and the output of frequency synthesizer 1008. The non-linear mixing in the RF mixer 1004, presents two products at the output of the RF mixer 1004, one at a desired intermediate frequency (1IF), and the other at an "image" (that is the signal product of the frequencies summed) frequency, which is rejected by conventional means such as filter 1005 ordinarily practiced in the art.

The intermediate frequency (IF) present at the output of the RF mixer 1004 is a product of a superimposed set of incoming coded modulation GNSS signals. By standard design practices and methods, these are set to fall within a tailored IF channel bandwidth designed to be at least as wide as the highest excursion of GNSS carrier frequencies (offset maximally by their carrier Doppler shift due to satellite movement relative to the remote GNSS receiver at a fixed ground position). Once down-converting the carrier to the IF, the final step is to suitably filter 1005 and amplify 1006, and then digitize the IF signal in an analog to digital converter 1007.

This presents to the baseband processing and correlation stage 1009, a serially digitized signal to decompose the signal by recursively processing to then extract time-of-flight timing information from each GNSS coded modulation signal available. The analog to digital converter 1007 is designed to convert at sufficient speed to transfer optimal signal energy to the baseband processor based upon minimizing sampling loss, while balancing the detail, or bit depth used to digitally represent the analog IF signal.

To align the frequency synthesizer 1008 to the incoming signals, a corrected local clock reference output from a local clock 1011 is used. The local clock reference output is based on comparing in the local clock 1011 the difference between output 1014 from a remote receiver clock recovery module 1016 and output from a CDXO 1012. Remote receiver clock recovery 1016 clock recovery stage measures and estimates the precise statistical mean delay of arriving packet signals. These signals are physically sensed on connection 1017, which is a direct electrical connection to the network media inside the protocol and interface stage 1020 which is a conditioned electrical interface to the external IP/packet data network connection 1021.

To increase sensitivity, the signal must sufficiently rise over the thermal noise occupying the same channel. A GNSS signal is such that under best reception conditions it arrives at a receiver no higher than 14 dB below the noise power occupying the same channel. To reduce the noise while maintaining the full information rate of the GNSS coded signal, long term coherent processing gain may be utilized.

To increase the complex coded modulated products emanating from the analog to digital converter 1007, a digital magnitude level 1030 and sign 1031 are connected to a complex mixer 1033 to form in-phase 1034 and quadrature 1035 signals. These complex in-phase 1034 and quadrature 1035 signals are connected to the complex correlators 1036, creating in-phase 1037 and quadrature 1038 correlation products to an integrate and dump stage 1039. Integrate and dump stage 1039 is timed, based on timing signal 1056 to integrate and then "dump" or decimate an output. The output of the integrate and dump stage 1039 represents the time-integrated product of consecutive bipolar bit samples. Should the consecutive bits result in a sufficiently net positive value over a selected integration period, the GNSS signal is deemed to be present at power detector 1041. Samples can be concatenated and serially stored in data memory 1048 to extend sensitivity non-coherently or coherently.

If the frequency and time are precise, stable controlled in CDXO 1012, then the reference code phase and frequency will be a truer replica of the incoming signal. This can provide longer coherent correlation intervals. As well known in the art, coherent integration develops more sensitivity in a given observation period if the oscillator and other design factors enable extension of the integration interval and the target frequency is sufficiently close to the true frequency, and the frequency value can be tracked during integration to adjust the reference code appropriately.

Microprocessor 1050 provides routines for several functions. It manages the search and acquisition process by managing the speed and detection threshold used to decide if the signal is deemed acquired with sufficiently low probability of error and should then be tracked (or re-acquired at certain time intervals) to continue measuring pseudo-range time samples. The acquisition or tracking modes control the search and lock 1046 and code-phase 1042 and frequency 4043 increment tasks respectively. These increment or adjust at a rate deemed sufficient to generate new pseudo-range outputs at a specified design rate. This rate is balanced against the available processing resources available to perform more computations in a given period of time. Management and other programmable instruction are contained in a ROM 1052 associated with the microprocessor 1050.

The microprocessor 1050 and programs running it are governed by the incoming assistance data module 1054. This readable memory register banks the incoming assistance data which are parameters based on current satellite status which in turn closely estimate the known available GNSS signal frequency and code-phase and binary coded navigation message bit state and time tag. Using this information, the closed loop receiver aims the receiver toward the likely precise frequency and searches the code-phase with an appropriate number of parallel correlators in order to seek, in reasonable time, the desired signal.

Another role for the microprocessor 1050 may be to draw and encode current assistance data residing in the assistance data module 1054 once drawn from a model server 205. Parameter data is converted to a form that is appropriate for regulating each parallel satellite signal search and within each channel finely adjusting each target satellite search process.

Another role for the microprocessor 1050 may be to measure carrier/noise ratio to provide model server 205 with current signal quality values in order to refine estimated position confidence.

Another role for the microprocessor 1050 may be to extract and measure pseudo-range data from each acquired satellite signal either based on the precision of the network disseminated clock information, via a precise local time reference 1010 or multiple satellite observations, that following know methods in the art, resolve pseudo-range time by reference to a common satellite time base.

Another role for the microprocessor 1050 may be to forward measurement and related time tag data stored in memory in suitable message packets for transmission through a serial communication module 1019 onto the IP network 201 and back to the model server 205.

This process may also be extended by searching for different satellite signals in a parallel process by operating on different channels, exacting replicating channels formed by baseband processing and correlation stage 1009 for each target incoming coded signal. The search process is one controlled within a closed loop formed by the baseband processing and correlation stage 1009 and microprocessor 1050 control loop, which in turn control the incrementing values of the coarse acquisition (CA) epoch code-phase and Doppler offset frequency. Probable values of code-phase and relatively precise values of frequency will be known and provided through the microprocessor 1050 and the server architecture described in FIG. 2 prior to the search to optimally bound the process.

The time and frequency management are enabled by import of the packet data stream, which is brought across the IP/packet data network connection 1021 and remote receiver protocol and interface stage 1020. The focus of the precise time output 1013 from the remote receiver clock recovery module 1016 is to regulate the receiver complex correlation and code replication processes in order to enhance receiver sensitivity, which if done optimally will be mostly constrained by the stability of CDXO 1012 oscillator.

Implementation of the baseband processing and correlation stage 1009 can be accomplished in a plurality of ways, but for illustration purposes the following conventionally practiced method is described using a software GPS system to exploit general-purpose Digital Signal Processing (DSP), such as Texas Instrument TMS320 family processors and IMAP or other suitable Real Time Operating Systems (RTOS) to use the capabilities of these built in processing stages already existing in commercial VoIP and certain end-device IP equipment today. Texas Instrument's TNETV1060 family embeds the previously mentioned DSP and supports baseband processing of GPS signals in a software-based implementation. The CDXO 1012, the remote receiver clock recovery module 1016, and the connection 1017 are conventional elements of an enabling intelligent system that provides the memory and real time computational and control processes to implement a hosted software implementation of a baseband processor.

The frequency and time synchronization services described in FIG. 10 above can be served by either in- or out-of band packet data signaling and communication interfaces. All these service functions reside in the serial communication module 1019. This module 1019 also registers and measures signal pulses at the physical layer to more accurately mark time. This step provides enhanced precision by avoiding internal timing variation imposed by registering time based on higher layer event timing. All the unit-timing functions are controlled through the output 1014 from a remote receiver clock recovery module 1016 to ensure synchronous operation in the client receiver logic.

Figure 11A:
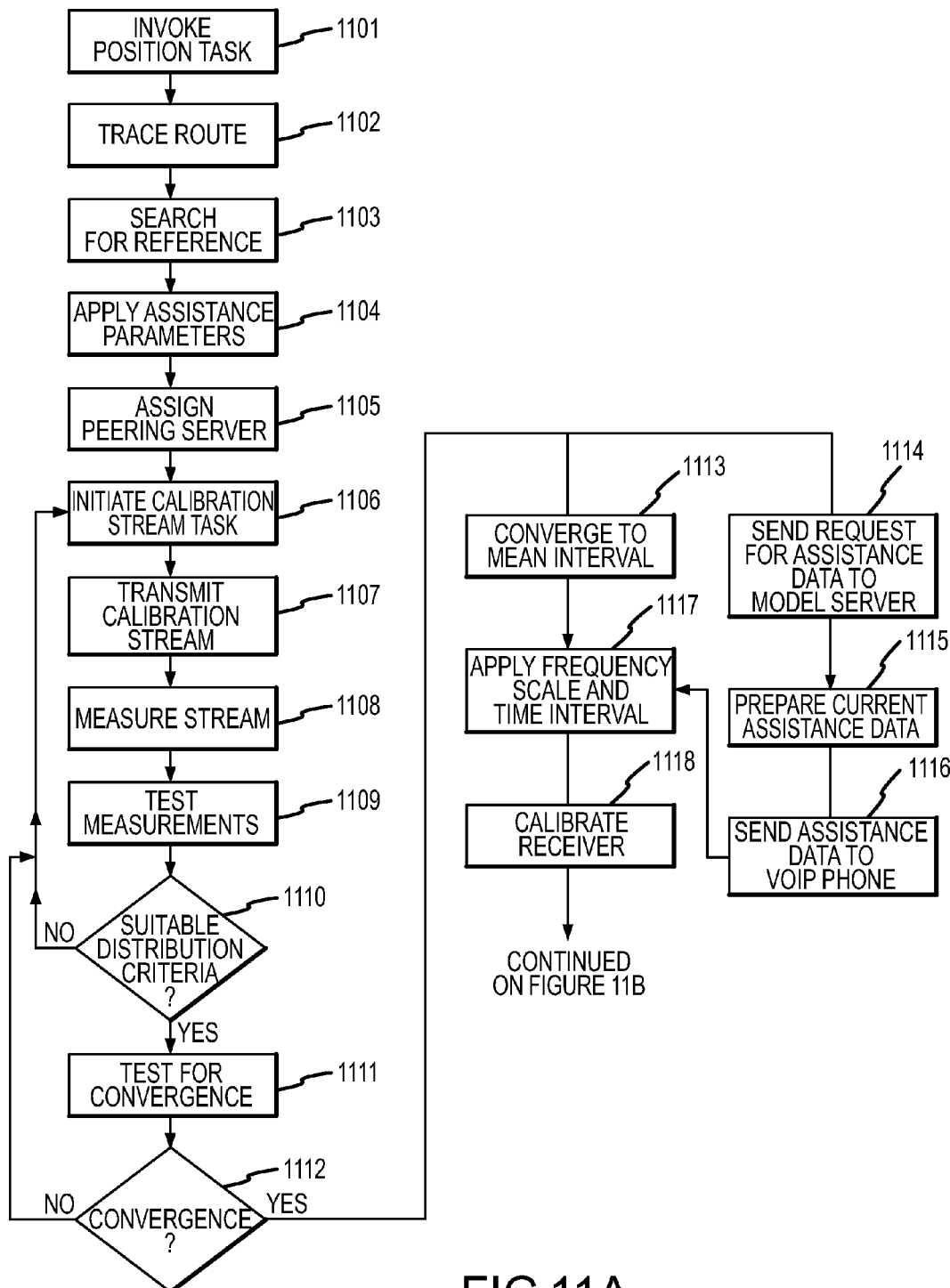
FIGS. 11A and 11B depict a flowchart illustrating steps for determining the position of a device connected to a network.
Figure 11B:
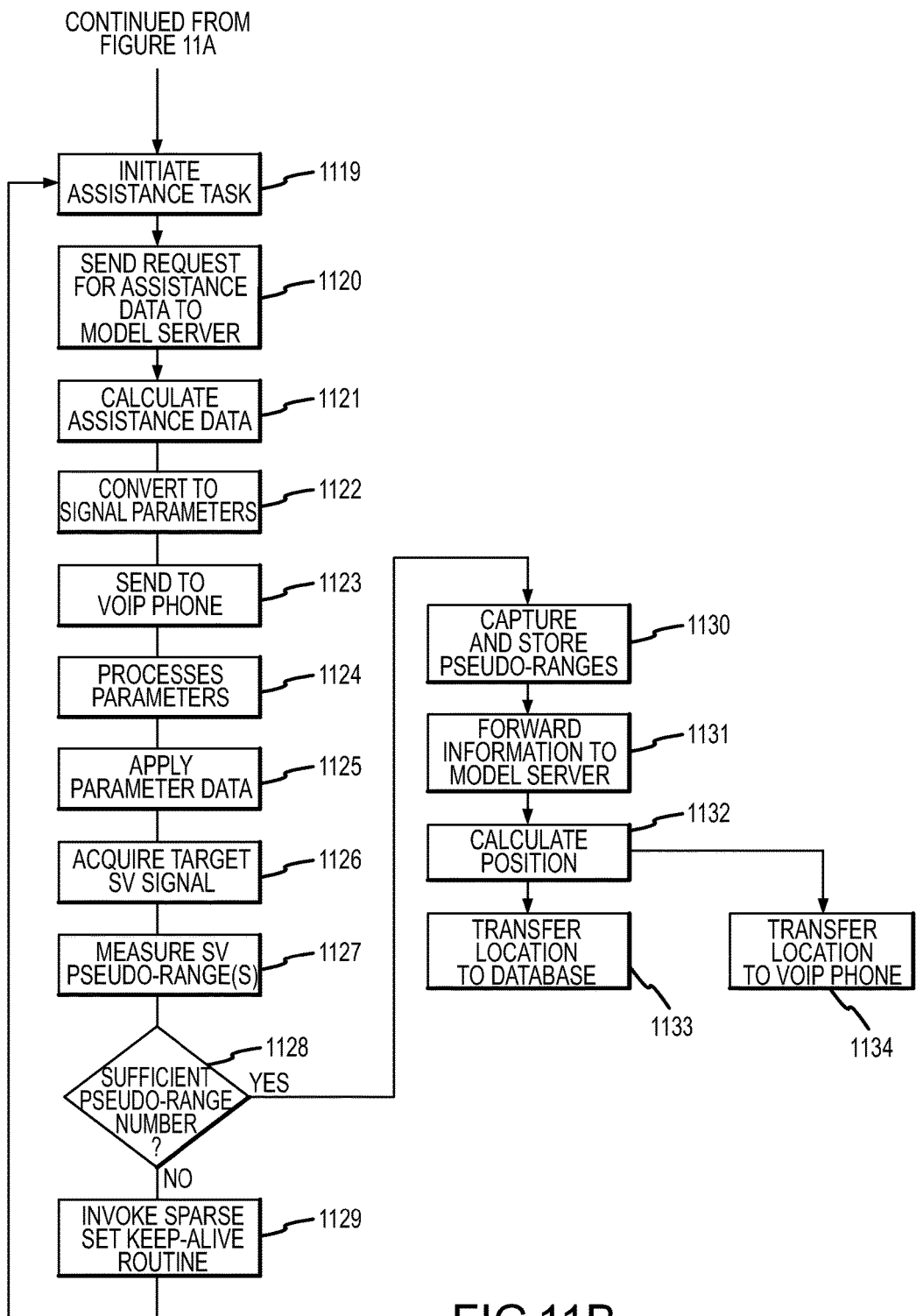

FIGS. 11A and 11B depict a single flowchart illustrating the process of populating a database with the location of an IP device starting from an initial request to locate the device when the position of the device is not known or assumed. For exemplary purposes the flowchart will be discussed in terms of a VoIP phone attached to an IP network gathering position data from GPS satellites. It should be appreciated that other types of devices capable of being interconnected through a network and other positioning systems and their equivalents are within the scope of the present invention.

The first step is to invoke 1101 the position task routine. This task may be invoked by the VoIP phone after a particular event such as a power cycle, a reconnection to a network, or a change in the configuration of a local network. The VoIP phone obtains or has pre-stored destination IP addresses which initiate the trace route task. The task may also be invoked by the VoIP phone, peering point server or model server after a predetermined amount of time has gone by without a verification of position. The next step is to perform a trace route 1102 between the VoIP phone and a model server. The trace route 1102 may be initiated by the VoIP phone upon start up. After the trace route 1102 is completed, the VoIP phone may send the results of the trace route 1102 to the model server. The trace route 1102 may also be initiated by the model server upon receiving a signal from the VoIP phone. In this case, the results of the trace route 1102 would be returned directly to the model server.

The model server uses this information to search 1103 router database(s) for a coarse geographical reference, then applies 1104 the appropriate signal model assistance parameters associated with the physical location of the closest geographically identified router to the end-device. The model server then assigns 1105 the appropriate proximate primary and secondary time/frequency servers to the VoIP phone whose location is to be determined.

The next step is to initiate 1106 the calibration stream task to launch the precisely inter-departing packets used to mark and symbolize the transferred time interval to the remote device. This step is performed by the VoIP phone once a peering point server has been assigned 1105. The assigned peering point server then transmits 1107 the calibration stream to the VoIP phone. The peering point server transmits 1107 the time and frequency reference packet stream across the network segment from the peering point server to the VoIP phone, now bounded by the known IP addresses, verifying a common or stable route in one or both directions. This sounds the channel for proper integrity testing 1109. The receiver measures 1108 the streamed packet inter-arrivals in the VoIP phone. As more samples are gathered, the VoIP phone tests 1109 the statistical distribution formed by a large number of samples for integrity of the transferred time and frequency process.

The testing 1109 uses distribution integrity criteria suitable to estimate the mean delay to within a suitable error criterion. A decision 1110 is made based on the results of the testing. If the criterion is not met, the process is re-initiated falling back to step 1106. If the criterion is met, the stream is tested 1111 for convergence, or the rate of increased estimation resolution of the mean reference interval delay based on the packet stream inter-arrival delay samples. If this falls within the criteria 1112 for appropriate rate of convergence, measurements of the refined mean delay are made 1113. If this falls within criteria 1112, the VoIP phone will also send 1114 a request for the most recent assistance data to the model server. The model server will prepare 1115 the most current assistance data and then send 1116 that data to the VoIP phone.

Once the refined mean interval is measured 1113, the next step is to apply 1117 the assistance data frequency and scaling information to create the proper reference clock reference to calibrate 1118 the remote receiver within the VoIP phone.

The next step is to initiate 1119 a standard remote receiver assistance task and draw the current satellite assistance and time and frequency data, and relevant satellite ephemeris and Doppler and navigation bit data from the model server. This is done by the VoIP phone sending 1120 a request for the most recent assistance data including satellite ephemeris and Doppler information to the model server. The model server calculates 1121 the geographic reference with the most proximate association with the remote receiver device.

The model server calculates 1122 the model signals impinging on the locale identified by the network geographic steps described above. This leads to reducing the model to signal parameters. This information is then sent 1123 to the VoIP phone.

The VoIP phone then processes 1124 and translates the signal parameters, and applies 1125 the parameter data. The remote receiver within the VoIP phone may then acquire 1126 the targeted satellite vehicle (SV) signal or signals. From the acquired signals, psuedo-range measurements are made 1127 for each SV. If the minimum number of quality pseudo-ranges to estimate a position fix have not been measured 1128, then the VoIP phone invokes 1129 a sparse set keep alive routine into which the receiver enters into an active state of occasionally scanning for new SV signals. Re-initiating 1119 does this based on model server data giving simple predictions of opportune upcoming SV values that provide higher likelihood of acquisition. The same process is repeated based on the scan for optimum signals based on future SV acquisition timing at the approximate location. In some cases the signals will be tested a few minutes later.

If the minimum number of quality pseudo-ranges to estimate a position fix has been measured 1128, the VoIP phone may capture and store 1130 the pseudo-ranges. Both pseudo-ranges (PR) and carrier to noise ratio information may then be forwarded 1131 to model server over network link. The model server then calculates and establishes 1132 an estimated position, as well as the confidence level around the fix. Once the position meets an estimated accuracy criterion, the next step is to transfer 1133 the location and VoIP phone information to a finished location database. The information forwarded 1131 to the model server may include the by-product of the opening trace route and time delay distribution data. This data is stored 1133 as part of the location data for the remote receiver. The estimated position may be transferred 1134 from the model server to the VoIP phone for storing within the VoIP phone itself.

Figure 12:
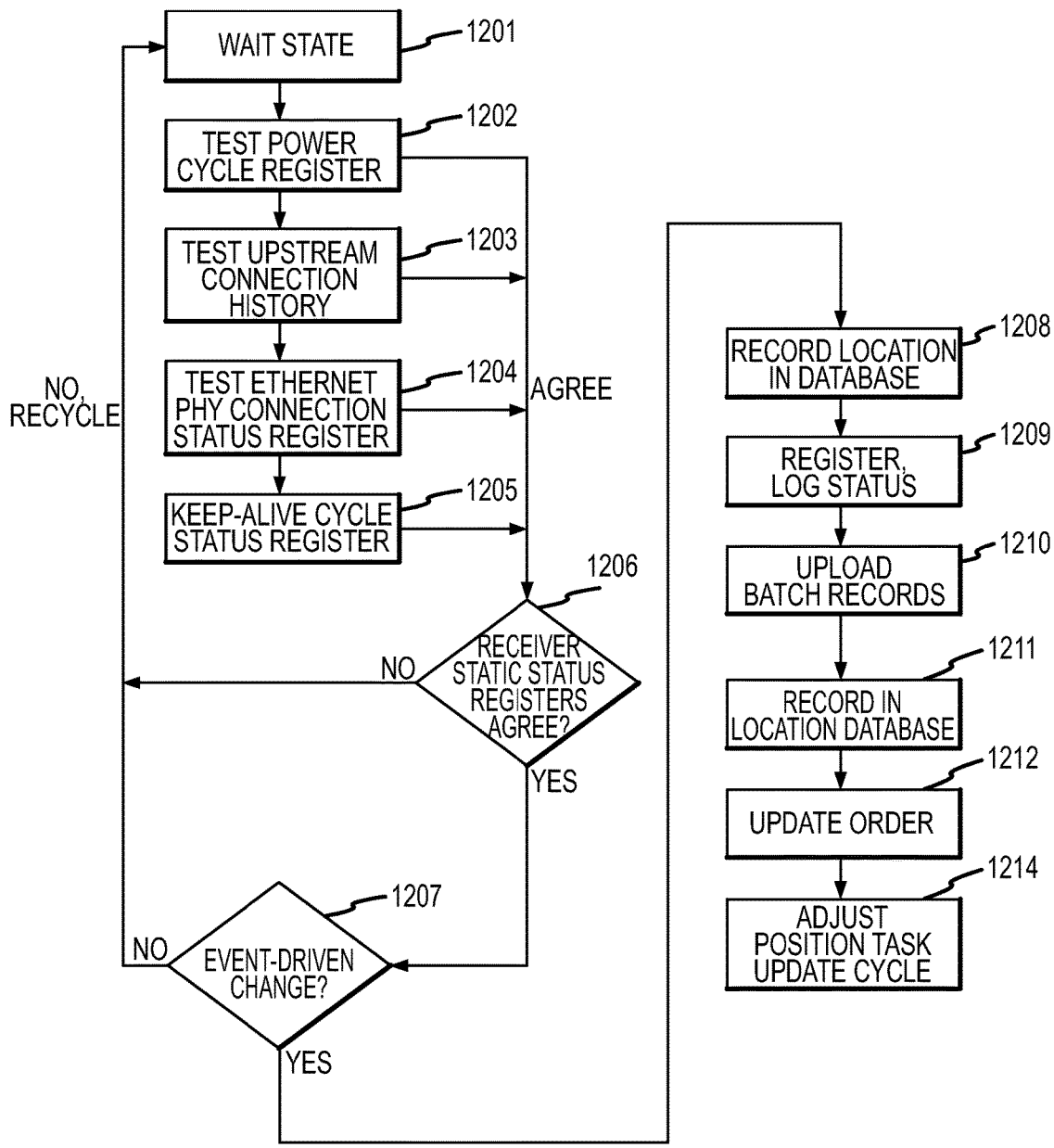
FIG. 12 is a flowchart illustrating steps for updating a previously determined position.

As noted above, a keep-alive process 1129 may be invoked. This process is illustrated the flow chart of FIG. 12.

This process may include regularly scanning the active status of the remote receiver, as well as invoking a position task (or often, a shorter re-check position case) based on event-driven criteria. The event driven criteria may include a test of power cycle change 1202, a test of network router or switch connection 1203, or a test of immediate connection such as Ethernet or WiFi connection 1204.

Moreover, the keep-alive status register is programmed to routinely check 1205 position status regardless of event-driven status changes. Conditions designed to change states in steps 1202, 1203, 1204, and 1205 are fed into the decision status step 1206. If the keep-alive and one other event-driven register changed, decision step 1207 will order the receiver to a dormant wait state 1201. If the receiver event-driven or keep-alive status indicates a state change (e.g., disconnection of device, loss of power, etc.) a test in decision step 1207 starts an external notification process.

The external notification process begins after an event driven change 1207. The keep-alive status interval is communicated 1208 to a log kept in the proximate and backup peering point servers where the information is logged 1209. When appropriate, and ordered by a processing center housing the model servers, the logged data is uploaded 1210 to a central database. The information is recorded 1211 in a location database which will generate an update order 1212 and send it to the VoIP phone based on policy and other network management settings at the central point. The VoIP phone will then adjust 1214 the update cycle or leave it at the current default setting.

Figure 13:
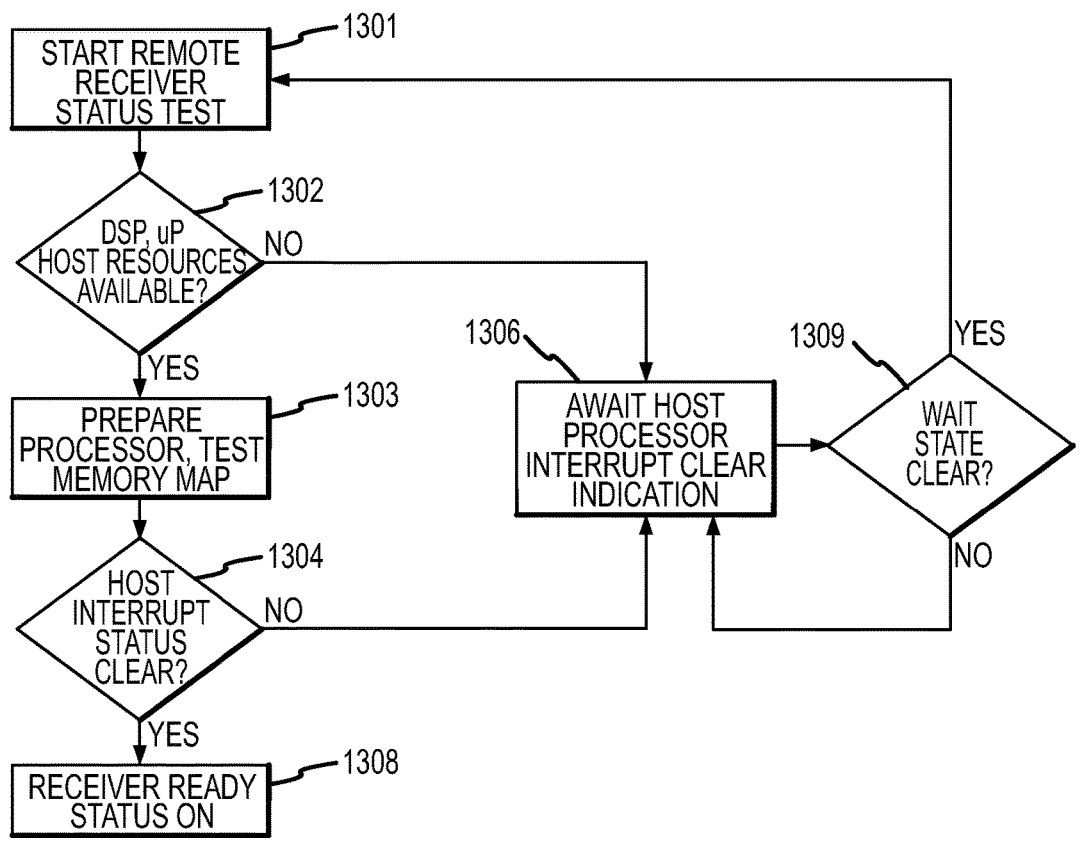
FIG. 13 is a flowchart illustrating steps for a start up process to determine resource availability of a device.

FIG. 13 illustrates a start up process for the remote receiver of the VoIP phone to test availability of hosted, or shared, resources in end-devices where this configuration is used. Step 1301 initiates the previously described VoIP phone positioning task. To start the positioning task, the receiver must acquire the shared digital signal processing and related memory resources of the host. A first step is to determine 1302 if the digital signal processing (DSP) and microprocessor host resources are available to perform a positioning task. If the resources are available the next step is to prepare 1303 the microprocessor and perform a test of the memory map. If this test 1304 results in a host interrupt status as being clear, the VoIP phone can be placed in a ready status. This process tests the shared resources for availability, and provides initialization of the resources to ensure integrity. If the resources are unavailable as indicated by the determinations performed at step 1302 or step 1304, the process goes to wait state 1306 called the await host processor interrupt clear indication. Once the resources are clear, the process can repeat starting at the initiation 1301, and if the resources are available, the process can be terminated 1308 and the VoIP phone can be placed into a ready status regarding the performance of a positioning task.

Figure 14:
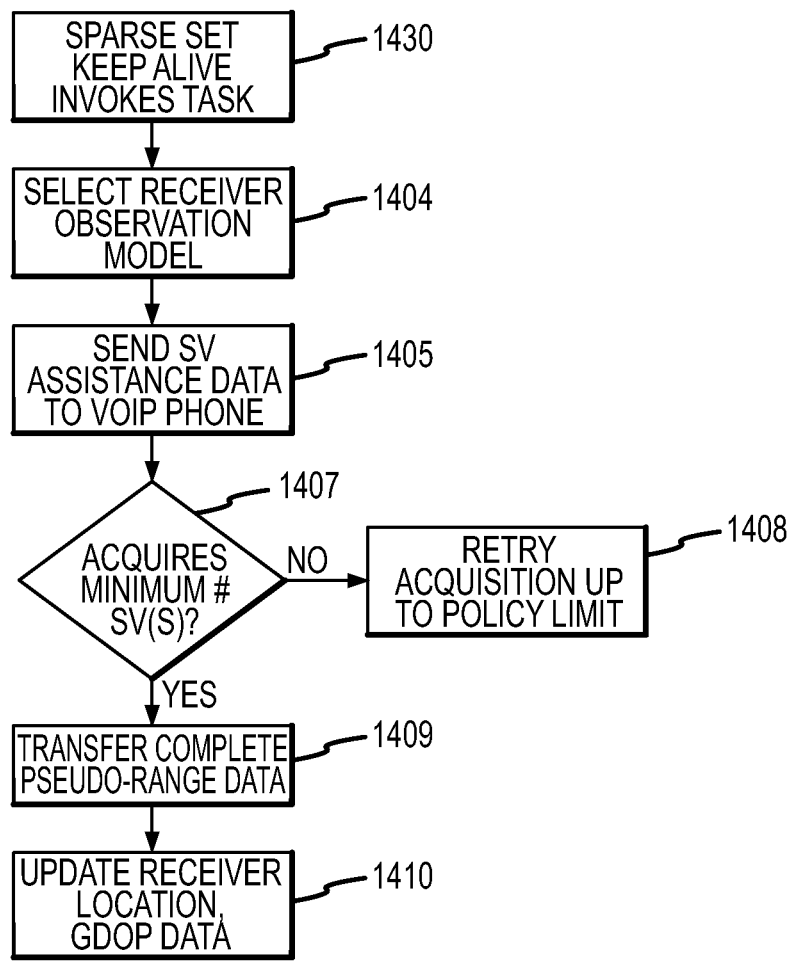
FIG. 14 is a flowchart illustrating steps for determining the position of a device using a time-spread method.

FIG. 14 depicts the process that exploits the time-spread observation feature (discussed in detail below) to scan for selecting optimally arriving signals in order to improve remote receiver position accuracy. The standard initial positioning task flow discussed above is undertaken. In the case where the receiver has posted a position solution to a first level of accuracy in the standard process, the VoIP phone may invoke 1430 a model server follow up task. The model server may then choose 1404 one or more optimum SVs in positions to reduce geometric error using conventional and known orbital models for GPS satellites. Optimal candidates are selected that minimize the geometric error and form an assistance order which is sent 1405 to the VoIP phone. A simple decision step 1407 is taken to determine the sufficiency of acquired signals to the criteria or policy limit. If the sufficiency is adequate, the VoIP phone processes the SV signals as described above and transfers 1409 the signal data to the model server. The model server then updates 1410 the position record for the remote receiver. If the sufficiency is inadequate, the VoIP phone may retry SV acquisition up to policy limits 1408.

Figure 15:
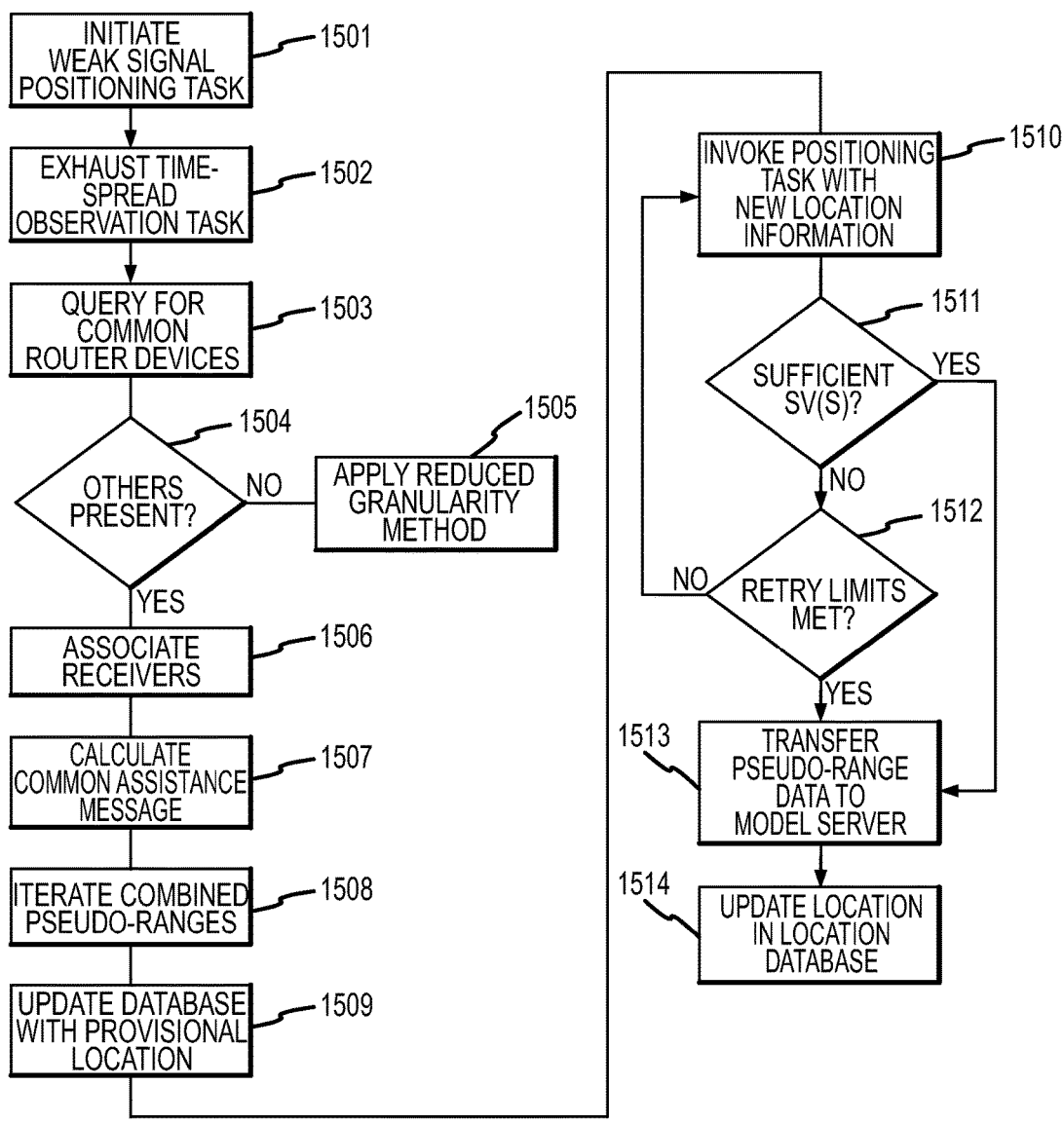
FIG. 15 is a flowchart illustrating steps for determining the position of a device using a long baseline method.

FIG. 15 is a flowchart illustrating a process to achieve additional satellite signal availability and position accuracy using the long baseline reception method previously noted. Long baseline reception refers to estimating position by combining observations from multiple remote receivers (such as multiple VoIP phones) all stationed in close vicinity, which is determined by the observation that they share a common IP addressed router or switch device in a packet data network. The long baseline feature would typical apply to enterprise and institutional networks that have extensively deployed VoIP devices, all attached to a common router or switch.

The long baseline method combines measurements from dispersed receivers and in so doing accepts some error (when compared to an ideal reception case) arising from an unknown "baseline," or intermediate network connection and distance between the receivers and the shared device. Thus, the long baseline inserts a physical distance error that is offset by the value of combining observations to synthesize a value, leading to a more accurate estimated position compared to an individual receiver. In practice, the baseline is normally across a short distance (often less than 100 meters horizontally from a central position) and is tolerable for the purpose of identifying the building street address of the remote receivers.

If during a previously described position identification process, it is determined that the receiver has insufficient satellite count or imperfect geometry-of-arrival pseudo-range measurements, a positioning task taking into account the incomplete nature of the current pseudo-range set may be initiated 1501. The next step may be to exhaust 1502 the time-spread observation task. If the time-spread observation task does not improve the quality of the position based on general service criteria, a query 1503 is initiated to find other remote receivers connected and associated with the same router address. If other remote receivers are not present 1504, the device location is defined as "less granular" and may be improved by another location method 1505 and/or may be returned to the time-spread observation task. The granular location may then be forwarded to a location database with an indication of approximate position.

If other remote receivers are present 1504, the model server may associate 1506 the pseudo-range information of the other receivers having a common router address. The combined pseudo-range information is then tested 1507 computationally across two or more possible receivers also commonly connected to the same router or switch to determine optimal parameters for determining the position of the associated devices. This optimization step is a computational task that takes into account the geometry, signal strength, signal quality of the entire ensemble of pseudo-ranges to find the best combined fix based on likely redundant information. The next step is to apply 1508 different baseline separation distances to generate more accurate estimates of the true position, scaling different baseline distance estimates. If the values converge at a particular separation value, it is applied to all the values, which are then stored 1509 provisionally in a location database. The position determined using this method projects the apparent multi-receiver position toward a central location (i.e., a point near the center of the subject building, which often translates to the street address of the subject building).

The new position location estimate may be actively tested in one or more of the long baseline linked receivers. This is accomplished by invoking 1510 the common positioning task previously described, but with the new more accurate position estimation as a result of the long baseline position determination process to acquire target SV signals. If this yields an adequate number of satellite signal acquisitions 1511, the pseudo-range data is then transferred 1513 to the model server.

If a sufficient number of the known SVs 1511 are still not observable, acquisition 1510 is retried until a program limit 1512 is met. If the program limit is met, but the position is less than fully resolved this information is transferred 1513 to the model server along with an indication of the long baseline position task attempt. After the pseudo-range data is transferred 1513 to the model server, the location in the location database is updated 1514. In the case where a position was updated even though a sufficient number of known SVs were not observable, the process may revert back to the acquisition step 1510 to re-test the position for sufficient SV pseudo-ranges. This recursive step is managed as a separate process with a distinct persistence re-try limit.

The long baseline method described above is, for example, useful in situations where the receivers are situated inside buildings where satellite signal reception may be limited. Generally, devices that operate inside many corporate buildings require as much as 50 dB more sensitivity relative to a receiver designed to capture GNSS signals just outside, so assistance and processing gain are essential to offset in-building signal attenuation. Wood-frame houses are less lossy; both signal levels and simultaneous satellite reception levels are greater thus enhance position fix accuracy. Generally, network-attached devices may be mobile or nomadic. In some cases, such devices will move between environments having different degrees of signal attenuation and thus reception challenge. As depicted herein, the devices housed inside buildings will need to acquire signals at much lower levels than other technologies optimized for autonomous (handhelds) or mobile network assisted devices.

The time-spread aspect mentioned above will now be described in greater detail. A common case where generally too few SV signals are available for a position fix using conventional methods is when the receiver is inside a building where too few simultaneously available satellite signals arrive to resolve a point-position. Since network-connected devices contemplated are normally not mobile (or in the case of wireless, the access points are stationary), this method substantially increases the likelihood of resolving a location fix, especially in cases where conditions prevent a minimum of four simultaneously acquired satellites, the traditional minimum observable number required to resolve a remote receiver device 3D position. An aspect of this invention is to allow more time to acquire weakened signals in applications where the remote receiver is not moved over long time periods. This aspect also allows improved accuracy by extending observation time to capture more satellites at different geometrical positions to produce higher quality position fixes. Another feature is to enable remote receivers to cumulatively compile more time-spread measurements when as few as one GNSS satellite signal is available per acquisition session.

This method may also be used to extend the number of independent GNSS signal measurements to further improve accuracy otherwise reduced by less than favorable signal levels, where there is less than optimal geometry, where multi-path signal distortion is present, or in cases where dominant GNSS signal jamming masks weaker signals. These cases arise normally in the case of in-building located IP or VoIP devices, where such devices are either cable-connected inside a network plant, or are linked by a short range wireless access point and the access point is stationary (and a position can be conferred based on the remote receiver being embedded inside the wireless access point a short distance away).

By spreading time of observation, additional signal processing gain is generated relative to conventional "snapshot" acquisition receivers (wherein the devices may be pre-positioned).

To extend the receiver signal measurement time and not introduce excessive errors, a key aspect is to control the value of remote receiver oscillator or clock "bias" and record it and correct for it at each GNSS signal acquisition event. Clock bias occurs where the oscillator is not calibrated at a known frequency, or it drifts at an unknown rate from a previously calibrated point, and thus generates an unknown time period offset relative to GNSS time. A conventional technique is to use a the acquired time of an extra satellite and calibrate the other acquired signals to the extra satellite.

Such a bias or offset cannot be separated from the pseudo-range measurement and estimation process since the bias introduces time contraction or lengthening into the transit time measurement. To control clock bias, the remote receiver time is registered, time stamped or "time-tagged" to values under a microsecond using the time/frequency dissemination system described above. Actual public network end-points can be measured from a peering point server designed for this purpose for round trip delay, and limit the actual GNSS time error as used by the remote receiver to calibration values that are less than 100 nanoseconds.

Biases of this small amount provide sufficient certainty of registered time accuracy at a remote receiver site to limit an individual path distance error attributable to oscillator clock bias to less than 30 meters. As more geometrically diverse measurements are gathered, the cumulative effect of the individual measurement errors tend to diminish in the result based on the navigation model and subsequent calculation process.

Other than the bandwidth capacities of each network segment, the actual error value will be a function of the numbers of router hops and route-segments between the remote end-point and an associated peering point server. The values disclosed herein are representative of actual measurements using a representative number of hops and routes, and peering point placements are chosen and otherwise suitably hop/route constrained to meet both commercial cost and network end-point coverage objectives.

GNSS satellites constantly move providing new views, even of the same satellite, and over time come into the field of view of quasi-fixed nomadic, or permanently fixed remote receivers. As the satellites move, new opportunities arise to attempt capture of more satellite signals, which in turns provides additional system processing gain, which may be added to coherent and cumulative non-coherent integration processing gain previously described. For perspective, variation in GNSS signal levels vary considerably inside buildings, as measured experimentally for GPS and direct satellite radio transmissions, signal levels can vary as much as 5-20 dB over a few minutes of time.

Conventional oscillators drift over time as much as 2-5 parts per million and without correction would lead to pseudo-range measurement uncertainties as much as several hundred meters. To produce a position, each pseudo-range measurement is placed into a common reference frame. These paths in such a frame are denoted below as $PR_1$, $PR_2$, $PR_3$, ... $PR_n$, representing the measured transit time offsets for a particular satellite signal based on that signal transiting between the satellite and the user receiver, at a velocity of the speed of light. These are calculated as follows:

$$PR_1 = [(x_1 - x_u)^2 + (y_1 - y_u)^2 + (z_1 - z_u)^2]^{\wedge}0.5 + B_{t1}$$

$$PR_2 = [(x_2 - x_u)^2 + (y_2 - y_u)^2 + (z_2 - z_u)^2]^{\wedge}0.5 + B_{t2}$$

$$PR_3 = [(x_3 - x_u)^2 + (y_3 - y_u)^2 + (z_3 - z_u)^2]^{\wedge}0.5 + B_{t3}$$

$$\ldots$$

$$PR_n = [(x_n - x_u)^2 + (y_n - y_u)^2 + (z_n - z_u)^2]^{\wedge}0.5 + B_{tn}$$

Where a three-dimensional reference frame is defined by x, y, and z representing three mutually orthogonal dimensions with a common origin point. Where the numeric subscript identifies dimensional values associated with each orbiting satellite vehicle orbital location, and using a common reference frame containing the 3D locations of the satellites and user location. Where the "u" subscript identifies three-dimensional values associated with the user receiver device. Where B is the clock bias at a particular time plus or minus 3 ns per meter.

A geometric and linear algebra analysis is applied to resolve the user position based on the individual path distances, a quantity deduced from the pseudo-range value, and the known dimensional values describing the true positions of the overhead satellites. This method is known to those skilled in the art. Current and granular satellite position is derived from reference sources and delivered to a model server over each instance of time.

Clock bias subscripts t1, t2, t3 ... tn refer to measured and recorded clock bias time error (recorded in a suitable time-tag message) which is associated with the absolute time, or in the alternative a standard reference time offset, marking the time that this particular pseudo-range measurement was registered at the remote receiver. This error value is used to eventually correct for the apparent time offset relative to zero clock bias error.

These distances are derived from a general equation of "coarse and fine" pseudo-range (PR) measurements, in the following manner:

Whole PR Measurement $(PR_{nT})$=Coarse+Fine PR Factors

Whole PR Measurement=Z-Count+Number of Navigation Bits (times 20 milliseconds)+Number of C/A code Epochs+Number of Whole C/A Code-phase States+Fraction of C/A Code-Phase When directly measured using directly referenceable clocks at both ends of the transmission link, these terms can be condensed to:

$PR_{nT}=c(t_u-t_{sn})$

Where c equals the speed of light (2.98×10^8 meters per second), $t_u$ equals the precise time of receipt of satellite n signal observed at user receiver, and $t_{sn}$ equals the precise time of departure of the emitted signal from satellite n. For highest path resolution, the relevant time is marked by a common reference modulation transition peak found by correlating each satellite vehicle 1023-bit C/A code epoch, a method capable of resolving to a small percentage of a code-phase bit width. Pseudo-range time measurements outside the above relatively simplified notion of transit path distance measurement, are known to those skilled in the art.

By way of the precise dissemination method described herein, the method used tags each individual GNSS signal acquisition event, and in turn applies an accurate error compensation value to each related pseudo-range measurement value. Among possible embodiments are to provide at the end of each signal acquisition session a time mark registration or "time stamp," that is referenced to a common, system-wide time standard, typically GNSS time, that can be used to eventually correct apparent pseudo-range measurement values into true range values.

This time tag is resolved using the high precision time transfer method described herein. This method uses a statistical determination of time interval symbolized, encoded, and transmitted across the channel in a streaming packet session of fixed, known packet inter-arrivals, then decoded. As mentioned above, this method also relies on judicious placements of the peering point servers so that they are relatively proximate (but not to a critical degree) to a multitude of remote receiver devices subtending each server's network domain. A typical example is one or two servers deployed per large metropolitan or regional area. In such a configuration, the time dissemination precision and related remote device time uncertainty is readily held to manageable values.

Technical references found in the art demonstrate that high precision time transfer over the asynchronous network medium can be done and is very useful to this field. Using a similar packet streaming measurement signal and suitable time recovery methods which transfer timestamp messages using a round trip connection, these systems are able to achieve precision levels of errors less than 120 nanoseconds based on taking frequent measurements.

Figure 16:
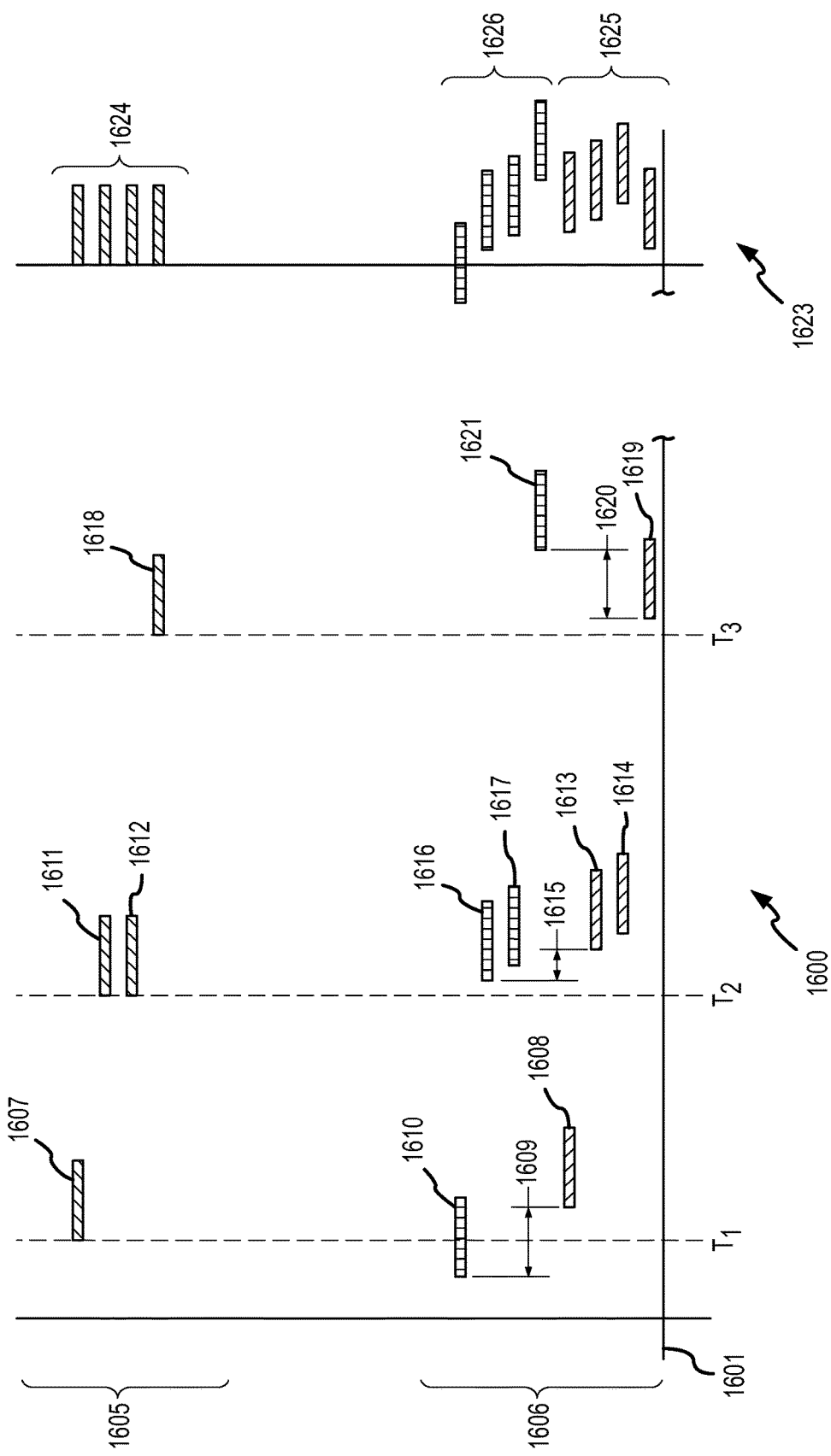
FIG. 16 is a schematic diagram illustrating a system of utilizing non-simultaneously received calibrated signal measurements to determine position.

FIG. 16 is a schematic representation of the transit time and measurement process. The focus is on the process of extracting and then correcting the remote receiver clock bias that is introduced over relatively long time-spread signal observation intervals. The schematic is divided into two main sections. The real-time section 1600 represents satellite signals and measurements taken over an extended period of time with the horizontal axis 1601 representing satellite time. The virtual section 1623 is a schematic representation of how time-spread observations may be combined to produce a location determination.

At a time T1 a C/A epoch signal leaves a first satellite 1607 at a precise time demarcated by a repeating sub-frame time containing navigation bits, which contains precisely 20 such C/A epochs, and is represented by a time continuum of a first satellite 1607. In the schematic, the elements in the upper section 1605 pertain to the transmission of signals by satellites and the elements in the lower section 1606 pertain to the reception of the satellite signals by the receiver. The signal is received by the receiver a short time after it is sent. This is represented by the offset from the first time T1 of the actual reception period 1608 of the signal from the first satellite 1607. The distance between the actual reception period 1608 of the first signal and T1 is representative of the signal transit time. Each transit time varies in path delay, a value which depends on the true distance between the satellite and remote receiver position location at the precise time of the signal receipt.

However, due to an internal clock inaccuracies or biases, the receiver timestamps the signal from the first satellite 1607 as being received as shown by the measured reception period 1610 for the first signal 1607. Since the receiver has been calibrated through contact with a peering point server as per the previously described procedure, the receiver is able to timestamp or record the amount of offset 1609 present at T1. In this instance, the clock bias 1609 has resulted in the receiver perceiving and registering the measured reception period 1610 as being received earlier than the actual reception period 1608.

Additional satellite signals come within the field of view and rise to detectable levels at T2. At T2, two satellite signals are received by the receiver. Signal 1611 is transmitted from a second satellite and signal 1612 is transmitted from a third satellite. The signals are received in satellite time at actual reception period 1613 for the signal from the second satellite 1611 and actual reception period 1614 for the signal from the third satellite 1612. The difference between the reception times 1613, 1614 is due to the different distances between the third satellite and the receiver and the fourth satellite and the receiver. However, due to internal clock inaccuracies or biases, the receiver timestamps the signals from the second 1611 and third satellites 1612 as being received as shown by the measured reception periods 1616, 1617, respectively. Since the receiver has been calibrated through contact with the peering point server as per the previously described procedure, the receiver is able to timestamp or record the amount of offset 1615 present at T2. Note that this offset is different than the offset that was present at T1. Through contact with the peering point server the receiver is able to maintain its calibration relative to satellite time.

Finally, at T3 a signal from a fourth satellite 1618 is received at actual reception period 1619. Again, due to internal clock inaccuracies or biases the receiver timestamps the signal from the fourth satellite 1618 as being received as shown by the measured reception period 1621. Note again that the offset 1620 has changed relative to its value at T1 and T2 and has changed signs in that the measured reception period 1621 is perceived as being received after its actual reception time.

Known GPS receivers, particularly consumer level receivers, generally do not have highly accurate timing capabilities and therefore require simultaneous reception of multiple GPS satellite signals to produce a location determination. In such systems, the simultaneous acquisition of multiple GPS satellite signals obviates the need for highly accurate timing capabilities. Such systems are incapable of making time-spread position determinations since any aggregation of time-spread measurements would result in uncalibrated signal acquisition and events such as depicted at 1626. In contrast, embodiments described herein are able to timestamp signal acquisitions by virtue of the calibration feature and therefore rebuild or calculate a complete set of corrected pseudo-range measurements 1625. From this complete set of pseudo-range measurements 1625, an accurate position determination can be made from signals departing at a known time reference 1624.

Correcting all measurements using the method described herein takes each uncorrected measurement 1610, 1616, 1617, 1621 and registers the local clock bias which is then compared to a local clock calibration value provided by disseminating time and frequency across the network (or alternatively, directly acts on the local oscillator by correcting the clock). The bias and contributing time offsets, shown as variations 1609, 1615, 1620 are subsequently used to correct the remote receiver oscillator directly, adjust the value at the remote receiver, or send the correction value to the model server and applying it to the final position fix value rendered in the Model Server.

If the precise time reference of the GPS system is known, the exact distance from each satellite from which a signal is received will be known. For example, a signal from a first satellite informs a device that it is a fixed distance from the first satellite, which is at a known point in space. This defines a sphere, wherein the device may be at any point on that sphere. A signal from a second satellite will define a second sphere. The intersection of the first and second sphere will form a circle wherein the device may be at any point on that circle. The signal from a third satellite will define a third sphere. The intersection of the first, second and third sphere will define two points in space. Generally, one of these two points will be at or near the surface of the earth and be used as a location fix for the GPS device. In this manner, a typical commercial GPS signal will be able to get a position fix once it knows its distance from three of the GPS satellites. To know this distance, it must have an accurate time reference, and this is derived from a fourth satellite signal. By performing calculations on the four signals, a commercial GPS devices able to derive the time reference and fix a position.

If, as in the embodiments described, the receiver has a time reference that need not be derived from the satellite signal, it may make a position fix with less received satellite signals. In other words, embodiments described herein may be able to make a position fix from three satellite signals. Moreover, if the embodiments described herein do receive four satellite signals, the fourth signal can be used to enhance the accuracy of the position fix, so for any given number of signals present, embodiments described herein may produce a higher accuracy position fix.

Additionally, embodiments described herein may use the earth as a third sphere and therefore only two satellite signals may be required to make a position fix. When using the earth as a third sphere, generally two points on the surface of the earth will be defined by the intersection between the two satellite signals spheres and the earth sphere. In this case, the data derived from the IP network may be used to choose which point is the receiver's location. Furthermore, the model servers may possess topographical information regarding the surface of the earth to increase the accuracy of a position fix wherein one of the spheres used for the fix is the surface of the earth. In this case, there may be errors due to the assumption that the user is on the surface of the earth, as opposed to, for example, being in a high-rise building. There may also be errors due to inaccuracies in the topographical data.

As previously discussed, a highly accurate, locally calibrated, altimeter may be included in the receiver. Under these circumstances, the altimeter may accurately define a third sphere, which could be used along with two satellite signals and the router information to generate an accurate position fix. The use of the altimeter would eliminate the errors discussed above related to inaccurate topographical information or to the assumption that the user is at ground level.

As discussed above, a satellite signal need not be received simultaneously when using the time-spread method. The time-spread observation method may be used to optimize network and system efficiencies by reducing the number of time-spread observations demanded by a target error criteria or budget. While obtaining a position fix, the model server may direct the receiver to aim at particular satellites, the reception of which would provide the most relevant data regarding position fix accuracy. The signals may also be selected on the basis of having the greatest joint likelihood of quality signal reception and greatest degree of position error mitigation both based on dilution of precision and calculations to make or rank candidate signals.

In the event that a sufficiently precise time and frequency alignment is not possible over the network to which the device is attached, the unit may derive a position fix using methods generally used by consumer GPS receivers as described above. In this regard, the model server may provide to the receiver satellite signal candidates most likely to provide sufficiently strong signals from which to derive the time information.

While various embodiments of the present invention have been described in detail, it is apparent that further modifications and adaptations of the invention will occur to those skilled in the art. However, it is to be expressly understood that such modifications and adaptations are within the spirit and scope of the present invention. It should also be appreciated that references contained herein to a device as being a VoIP phone should be considered exemplary and that any network-connected device with position determining capabilities is included within the spirit and scope of the present invention. Also, the terms "receiver," "remote receiver," "end receiver" and "receiver" contained herein generally apply to the signal receiving module or portion of the network-connected device. As noted above the network may be any of a variety of networks including asynchronous networks such as IP networks. Also as noted above, although the embodiments are generally described in terms of receiving GPS signals, it should be appreciated that any positioning system may be used and be within the spirit and scope of the present invention. These systems include other GNSS systems that may be deployed currently or in the future along with current and future terrestrial based positioning systems.

What is claimed is:

1. An apparatus comprising:
a timing module comprising a local clock;
a network interface module for interfacing with an asynchronous IP network;
a signal receiving module driven by said local clock for receiving signals from transmitters of a positioning system;

an aligning module, executed by a processor of said apparatus, for aligning said signal receiving module to signal characteristics of said positioning signal at a first estimated position of said apparatus, wherein said aligning module is operable to obtain said signal characteristic regarding said positioning system at said first estimated position of said apparatus from said asynchronous IP network by said network interface module;

a calibration module, executed by said processor of said apparatus, operable to calibrate at least one of a time reference or a frequency reference of said local clock of said apparatus with corresponding frequency and time aligning information regarding said positioning system that is derived based on communication characteristics of a communication between said network interface module and an external time reference over said asynchronous IP network, wherein said calibration of said at least one of said time reference or said frequency reference occurs prior to said signal receiving module receiving said signals from said transmitters of said positioning system; and a processing module for processing signals received by said signal receiving module, wherein said processing module is operable to determine a second position of said apparatus relative to said positioning system based at least in part on said signals received by said signal receiving module and said calibration, and wherein said second position is more accurate than said first estimated position.

2. The apparatus of claim 1, wherein said apparatus is a voice over data network unit.

3. The apparatus of claim 1, wherein said apparatus is a data unit.

4. The apparatus of claim 1, wherein said apparatus is a VoIP unit.

5. The apparatus of claim 1, wherein said apparatus is a phone.

6. The apparatus of claim 1, wherein said positioning system is a GNSS.

7. The apparatus of claim 6, wherein said GNSS at least one of is the GPS, Glonass, Galileo and QZSS.

8. The apparatus of claim 1, wherein said processing module is operable to determine true time relative to said positioning system based at least in part on said signals received by said signal receiving module and said calibration.

9. The apparatus of claim 1, further comprising a barometric pressure sensor in operative communication with said signal receiving module to assist in determining an altitude at which said apparatus is located.

10. A Voice Over Internet Protocol (VoIP) device comprising:
a voice conversion module operable to convert voice to data and data to voice;
a network interface module for interfacing with an asynchronous IP network;
a timing module comprising a local clock, wherein said timing module is operable to calibrate a time reference of said local clock with a time reference to said GNSS based on corresponding frequency and time aligning information that is derived based on communication characteristics of a communication between said network interface module and an external time reference over said asynchronous IP network;
a signal receiving module driven by said local clock for receiving signals from transmitters of a GNSS;

an aligning module, executed by a processor of said VoIP device, for aligning said signal receiving module to signal characteristics of said positioning system at a first estimated position of said VoIP device, wherein said aligning module is operable to obtain said signal characteristics regarding said GNSS at said first estimated position of said VoIP device from said asynchronous IP network by said network interface module; and a processing module, executed by a processor of said VoIP device, for processing signals received by said signal receiving module, wherein said processing module is operable to determine a second position of said apparatus relative to said GNSS based at least in part on said signals received by said signal receiving module and said calibrated time reference, and wherein said second position is more accurate than said first estimated position.

11. The VoIP device of claim 10, wherein said GNSS is the GPS.

12. A system for use in determining one of a position or a time reference of a device connected to an asynchronous IP network relative to a fixed coordinate system, comprising:
a device connected to said asynchronous IP network, wherein said device is operable to receive signals from transmitters of a positioning system and comprises a processing module for processing signals received by said signal receiving module;
a model server in communication with said device over said asynchronous IP network, wherein said model server is operable to provide to said device information regarding signal characteristics of said transmitters of said positioning system; and
a peering point server in communication with said device over said asynchronous IP network, wherein said peering point server is operable to derive at least one of frequency information or time information for distribution to said device over said asynchronous IP network for calibration of a local clock of said device to an external time reference of said positioning system based on communication characteristics of a communication between said device and said peering point server over said asynchronous IP network;
wherein said device further comprises an aligning module, executed by a processor of said device, for aligning said processing module to said signal characteristics of said transmitters of said positioning system at a first estimated position of said device and a calibration module, executed by said processor of said device, operable to calibrate at least one of a time reference or a frequency reference of said local clock of said device with at least one of said frequency or said time information, wherein said calibration of said at least one of said time reference or said frequency reference occurs prior to said device receiving said signals from said transmitters of said positioning system; and
wherein said processing module is operable to determine a position of said device relative to said positioning system based at least in part on said signals from said transmitters of said positioning system and said time reference of said device that is calibrated to said external time reference of said positioning system.

13. The system of claim 12, wherein said positioning system is the GPS.

14. The system of claim 12, wherein said model server is operable to determine an estimate of the location of said device.

15. The system of claim 12, wherein said model server comprises a database correlating a plurality of devices to a plurality of corresponding locations.

16. The system of claim 12, wherein said device is a VoIP phone.

* * * * *

UNITED STATES PATENT AND TRADEMARK OFFICE
CERTIFICATE OF CORRECTION

PATENT NO. : 9,661,134 B2  Page 1 of 1
APPLICATION NO. : 13/748318
DATED : May 23, 2017
INVENTOR(S) : Lee et al.

It is certified that error appears in the above-identified patent and that said Letters Patent is hereby corrected as shown below:

In the Specification

Column 29, Line 66, delete "(11F)" and insert therefore --(fIF)--

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*